(12) United States Patent
Bhatnagar et al.

(10) Patent No.: US 9,158,173 B2
(45) Date of Patent: Oct. 13, 2015

(54) SPACERS FOR INSULATED GLASS UNITS

(71) Applicant: View Inc., Milpitas, CA (US)

(72) Inventors: Yashraj Bhatnagar, Santa Clara, CA (US); Trevor Frank, San Jose, CA (US); Fabian Strong, Fremont, CA (US); Sridhar Kailasam, Fremont, CA (US); Robert Babcock, Milpitas, CA (US); Ronald M. Parker, Olive Branch, MS (US); Robert T. Rozbicki, Germantown, TN (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 14/152,873

(22) Filed: Jan. 10, 2014

(65) Prior Publication Data
US 2014/0192393 A1 Jul. 10, 2014

Related U.S. Application Data

(63) Continuation of application No. 13/312,057, filed on Dec. 6, 2011, now Pat. No. 8,711,465.

(60) Provisional application No. 61/421,154, filed on Dec. 8, 2010, provisional application No. 61/435,914, filed on Jan. 25, 2011.

(51) Int. Cl.
*G02F 1/153* (2006.01)
*G02F 1/161* (2006.01)
(Continued)

(52) U.S. Cl.
CPC .......... *G02F 1/161* (2013.01); *B32B 17/10055* (2013.01); *B32B 17/10174* (2013.01);
(Continued)

(58) Field of Classification Search
CPC ............ E06B 3/66314; E06B 3/66328; E06B 2003/6638
USPC ................... 359/265–275; 345/105
See application file for complete search history.

(56) References Cited

U.S. PATENT DOCUMENTS 4,306,140 A 12/1981 Stromquist
4,941,302 A 7/1990 Barry
(Continued)

FOREIGN PATENT DOCUMENTS

CN 1380991 A 11/2002
CN 1784631 A 6/2006
(Continued)

OTHER PUBLICATIONS

Notice of Allowance dated Jun. 13, 2014 for U.S. Appl. No. 14/103,660.
(Continued)

*Primary Examiner* — Tuyen Tra
(74) *Attorney, Agent, or Firm* — Weaver Austin Villeneuve & Sampson LLP; Brian D. Griedel

(57) ABSTRACT

This disclosure provides spacers for smart windows. In one aspect, a window assembly includes a first substantially transparent substrate having an optically switchable device on a surface of the first substrate. The optically switchable device includes electrodes. A first electrode of the electrodes has a length about the length of a side of the optically switchable device. The window assembly further includes a second substantially transparent substrate a metal spacer between the first and the second substrates. The metal spacer has a substantially rectangular cross section, with one side of the metal spacer including a recess configured to accommodate the length of the first electrode such that there is no contact between the first electrode and the metal spacer. A primary seal material bonds the first substrate to the metal spacer and bonds the second substrate to the metal spacer.

30 Claims, 14 Drawing Sheets

(51) Int. Cl.
*B32B 17/10* (2006.01)
*E06B 3/663* (2006.01)

(52) U.S. Cl.
CPC ....... *B32B17/10513* (2013.01); *E06B 3/66314* (2013.01); *E06B 3/66328* (2013.01); *E06B 3/66352* (2013.01); *E06B 2003/6638* (2013.01); *E06B 2003/66385* (2013.01); *Y10T 403/55* (2015.01)

(56) References Cited

U.S. PATENT DOCUMENTS

| | | | |
|---|---|---|---|
| 5,170,108 | A | 12/1992 | Peterson et al. |
| 5,313,761 | A | 5/1994 | Leopold |
| 5,877,936 | A | 3/1999 | Nishitani et al. |
| 5,948,195 | A | 9/1999 | Thomas |
| 6,068,720 | A | 5/2000 | McHugh |
| 6,176,715 | B1 | 1/2001 | Buescher |
| 6,369,935 | B1 * | 4/2002 | Cardinal et al. ............. 359/265 |
| 6,407,847 | B1 | 6/2002 | Poll et al. |
| 6,420,071 | B1 * | 7/2002 | Lee et al. .................... 429/300 |
| 6,567,708 | B1 | 5/2003 | Bechtel et al. |
| 6,897,936 | B1 | 5/2005 | Li et al. |
| 7,941,982 | B2 | 5/2011 | Merica |
| 8,643,933 | B2 | 2/2014 | Brown et al. |
| 8,669,503 | B2 | 3/2014 | Johnson et al. |
| 8,711,465 | B2 | 4/2014 | Bhatnagar et al. |
| 8,800,221 | B1 | 8/2014 | Header |
| 8,810,889 | B2 | 8/2014 | Brown et al. |
| 9,019,588 | B2 | 4/2015 | Brown et al. |
| 2003/0041533 | A1 | 3/2003 | Trpkovski |
| 2003/0227663 | A1 | 12/2003 | Agrawal et al. |
| 2006/0187608 | A1 | 8/2006 | Stark |
| 2006/0283084 | A1 * | 12/2006 | Johnson ............................ 49/1 |
| 2009/0323160 | A1 * | 12/2009 | Egerton et al. ................ 359/275 |
| 2012/0026573 | A1 * | 2/2012 | Collins et al. ................. 359/275 |
| 2013/0278988 | A1 | 10/2013 | Jack et al. |
| 2014/0160550 | A1 | 6/2014 | Brown et al. |
| 2014/0170863 | A1 | 6/2014 | Brown |
| 2014/0247475 | A1 | 9/2014 | Parker et al. |
| 2014/0349497 | A1 | 11/2014 | Brown et al. |
| 2014/0355097 | A1 | 12/2014 | Brown et al. |
| 2015/0092260 | A1 | 4/2015 | Parker et al. |
| 2015/0118869 | A1 | 4/2015 | Brown et al. |

FOREIGN PATENT DOCUMENTS

| | | |
|---|---|---|
| CN | 1822951 A | 8/2006 |
| CN | 202108407 | 1/2012 |
| GB | 1437198 | 5/1976 |
| JP | 2000-257352 | 9/2000 |
| WO | WO02/08826 A1 | 1/2002 |
| WO | WO03001290 A1 | 1/2003 |
| WO | WO2006133298 A2 | 12/2006 |
| WO | WO2006133298 A3 | 12/2007 |
| WO | WO2013/090264 | 6/2013 |
| WO | WO2014/032023 | 2/2014 |
| WO | WO2014/169253 | 10/2014 |

OTHER PUBLICATIONS

U.S. Appl. No. 14/196,895, filed Mar. 4, 2014, entitled "Improved Spacers and Connectors for Insulated Glass Units".
European Search Report dated Mar. 3, 2014 for EP Application No. 11846667.1.
U.S. Appl. No. 14/512,297, filed Oct. 10, 2014, entitled "Electrochromic Window Fabrication Methods", and preliminary amendment filed Oct. 10, 2014.
U.S. Appl. No. 14/325,290, filed Jan. 7, 2015.
Office Action dated Nov. 3, 2014 for U.S. Appl. No. 13/456,056.
Office Action dated Oct. 6, 2014 for U.S. Appl. No. 13/968,258.
Notice of Allowance dated Oct. 9, 2014 for U.S. Appl. No. 14/325,290.
International Preliminary Report on Patentability dated Jun. 26, 2014 from PCT/US2012/068950.
International Preliminary Report on Patentability dated Jun. 11, 2014 for PCT/US2013/037644.
International Search Report and Written Opinion dated Aug. 19, 2014 for PCT/US2014/033870.
Ernst, Randi, "Gas Filling of IG Units" by FDR Design, Inc. (undated), 37 pages.
Preliminary Amendment filed Apr. 6, 2015 in U.S. Appl. No. 14/512,297.
Office Action dated Mar. 31, 2015 in U.S. Appl. No. 14/196,895.
Notice of Allowance dated Mar. 31, 2015 for U.S. Appl. No. 14/325,290.
International Preliminary Report on Patentability dated Mar. 5, 2015 for PCT/US2013/056506.
International Search Report and Written Opinion dated May 18, 2015 for PCT/US2015/014479.
Final Office Action dated Jun. 5, 2015 in U.S. Appl. No. 13/968,258.
European Search Report dated Apr. 2, 2015 for EP Application No. 12858168.3.
CN Office Action dated Jun. 3, 2015 in CN Application No. 201280069715.1.
Final Office Action dated Jul. 16, 2015 for U.S. Appl. No. 13/456,056.
CN Office Action dated Jun. 2, 2015 for CN Application No. 201180058960.8.

* cited by examiner

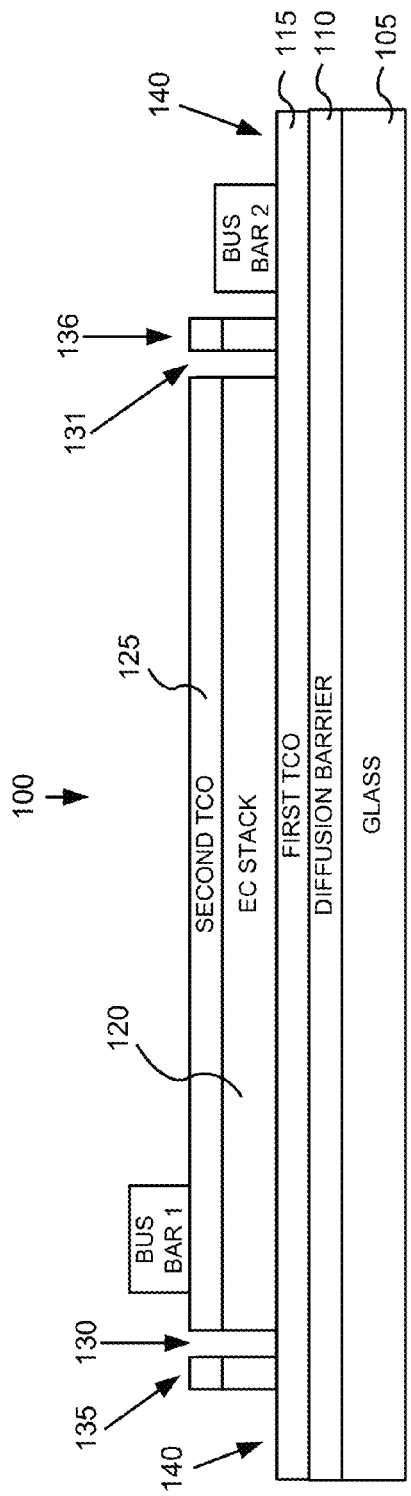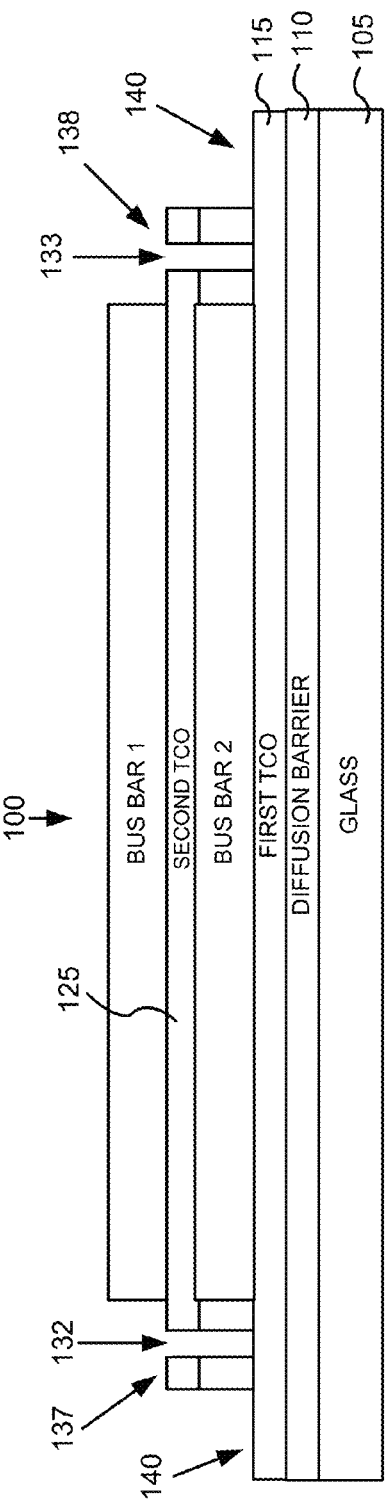

SPACERS FOR INSULATED GLASS UNITS

CROSS-REFERENCE TO RELATED APPLICATIONS

This application is a continuation of U.S. patent application Ser. No. 13/312,057, filed Dec. 6, 2011, by Bhatnagar et al., which application claims benefit under 35 U.S.C. §119(e) to U.S. Provisional Patent Application No. 61/421,154, filed Dec. 8, 2010, and to U.S. Provisional Patent Application No. 61/435,914, filed Jan. 25, 2011, all of which applications are herein incorporated by reference.

FIELD

The disclosed embodiments relate generally to spacers and insulated glass units containing them, and more particularly to insulated glass units including optically switchable devices.

BACKGROUND

Various optically switchable devices are available for controlling tinting, reflectivity, etc., of window panes or lites. Electrochromic devices are one example of optically switchable devices. Electrochromism is a phenomenon in which a material exhibits a reversible electrochemically-mediated change in an optical property when placed in a different electronic state, typically by being subjected to a voltage change. The optical property being manipulated is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial, and other uses. The color, transmittance, absorbance, and/or reflectance of such windows may be changed by inducing a change in the electrochromic material; i.e., electrochromic windows are windows that can be darkened or lightened electronically. A small voltage applied to an electrochromic device of the window will cause it to darken; reversing the voltage causes it to lighten. This capability allows for control of the amount of light that passes through the window, and presents an enormous opportunity for electrochromic windows to be used not only for aesthetic purposes but also for significant energy-savings. With energy conservation being foremost in modern energy policy, it is expected that growth of the electrochromic window industry will be robust in the coming years.

SUMMARY

Spacers for insulated glass units (IGUs) incorporating electrochromic windows are disclosed herein. The IGUs disclosed herein generally include measures for avoiding electrical shorting between a metal spacer and conductive components of the electrochromic window, such as bus bars, wires, and associated electrical connections.

In one embodiment, a window assembly includes a first substantially transparent substrate having an optically switchable device disposed on a surface of the first substantially transparent substrate. The optically switchable device includes electrodes. A first electrode of the electrodes has a length about the length of a side of the optically switchable device (e.g., the optically switchable device may be rectangular). The window assembly further includes a second substantially transparent substrate and a metal spacer between the first and the second substantially transparent substrates. The metal spacer has a substantially rectangular cross section, with one side of the metal spacer including a recess configured to accommodate the length of the first electrode such that there is no contact between the first electrode and the metal spacer. A primary seal material bonds the first substantially transparent substrate to the metal spacer and bonds the second substantially transparent substrate to the metal spacer.

In another embodiment, a window assembly includes a first substantially transparent substrate having an optically switchable device disposed on a surface of the first substantially transparent substrate. The optically switchable device includes electrodes. A first electrode of the electrodes has a length about the length of a side of the optically switchable device. The window assembly further includes a second substantially transparent substrate and a metal spacer between the first and the second substantially transparent substrates. The metal spacer has a substantially rectangular cross section, with at least one external face of the metal spacer being coated with an electrically insulating coating that prevents electrical communication between the metal spacer and the first electrode. A primary seal material bonds the first substantially transparent substrate to the metal spacer and bonds the second substantially transparent substrate to the metal spacer.

In another embodiment, a window assembly includes a first substantially transparent substrate having an optically switchable device disposed on a surface of the first substantially transparent substrate. The optically switchable device includes electrodes. A first electrode of the electrodes includes a lead. The window assembly further includes a second substantially transparent substrate and a metal spacer between the first and the second substantially transparent substrates. A primary seal material bonds the first substantially transparent substrate to the metal spacer and bonds the second substantially transparent substrate to the metal spacer. The metal spacer and the primary seal material form a barrier between an exterior region of the window assembly and an interior region of the window assembly. A connector key joins with or otherwise connects two ends of the metal spacer, with the lead passing from the first electrode, under the connector key, and into the exterior region of the window assembly. The connector key is not in electrical communication with the lead.

In another embodiment, a window assembly includes a first substantially transparent substrate having an optically switchable device disposed on a surface of the first substantially transparent substrate. The optically switchable device includes electrodes. A first electrode of the electrodes has a length about the length of a side of the optically switchable device. The window assembly further includes a second substantially transparent substrate and a spacer between the first and the second substantially transparent substrates. The spacer includes a metal portion having a substantially rectangular hollow cross section and an electrically non-conductive portion having a substantially rectangular cross section. One side of the rectangular cross section of the electrically non-conductive portion includes a recess that forms a channel along the one side that accommodates the length of the first electrode. A primary seal material bonds the first substantially transparent substrate to the spacer and bonds the second substantially transparent substrate to the spacer.

In another embodiment, a window assembly includes a first substantially transparent substrate having an optically switchable device disposed on a surface of the first substantially transparent substrate. The optically switchable device includes electrodes. A first electrode of the electrodes has a length about the length of a side of the optically switchable device. The window assembly further includes a second substantially transparent substrate and a metal spacer between the first and the second substantially transparent substrates. The metal spacer has a substantially rectangular cross section. A first primary seal material bonds the first substantially transparent substrate to the metal spacer. The first primary seal material includes electrically non-conductive particles that define a spacing between the first substantially transparent substrate and the metal spacer and prevent contact between the metal spacer and the first electrode. A second primary seal material bonds the second substantially transparent substrate to the metal spacer.

These and other features and advantages will be described in further detail below, with reference to the associated drawings.

BRIEF DESCRIPTION OF THE DRAWINGS

FIGS. 1A-1C show examples of schematic diagrams of electrochromic devices formed on windows.

DETAILED DESCRIPTION

It should be understood that while the disclosed embodiments focus on electrochromic (EC) windows (also referred to as smart windows), the concepts disclosed herein may apply to other types of switchable optical devices, including liquid crystal devices, suspended particle devices, and the like. For example, a liquid crystal device or a suspended particle device, instead of an electrochromic device, could be incorporated in any of the disclosed embodiments.

An insulated glass unit (IGU) is part of the transparent component of a window. In the following description, an IGU may include two substantially transparent substrates, for example, two glass lites, where at least one lite includes an electrochromic device disposed thereon, and the lites have a spacer disposed between them. One or more of the lites may itself be a laminate structure of lites. An IGU is typically hermetically sealed, having an interior region that is isolated from an exterior region including the ambient environment.

Disclosed herein are various embodiments in which electrochromic windows are incorporated in IGUs with spacers having improved configurations. An electrochromic window includes a transparent substrate (e.g., a glass sheet or lite) on which is provided a thin electrochromic device. Metal spacers conventionally employed in IGUs may not work well with electrochromic windows due to, e.g., shorting issues with the electrical components of the electrochromic device on one or more lites of the window unit. Specifically, the IGUs disclosed herein generally have measures for avoiding electrical shorting between a metal spacer and conductive components of the electrochromic window, such as bus bars, for example.

For example, electrochromic devices on glass lites use conductive wires, bus bars, or other connections that pass a spacer used to form an IGU, for electrical communication to the electrochromic device. Spacers are often chosen, or required, to be a metal, and for some IGUs, the glass lites may be compressed against the spacer. In some configurations, there are problematic issues created by compressing a metallic, conductive spacer against a conductor (i.e., the conductive wires, bus bars, or other connections) of the electrochromic device. Some conventional sealants may not suffice as insulators in such conditions.

In order to orient the reader to the embodiments of IGUs disclosed herein, a brief discussion of electrochromic devices, edge deletion, and IGUs is provided. This initial discussion of electrochromic devices, edge deletion, and IGUs is provided for context only, and the subsequently described embodiments of spacers are not limited to the specific features and fabrication processes of this initial discussion.

Figure 1C:
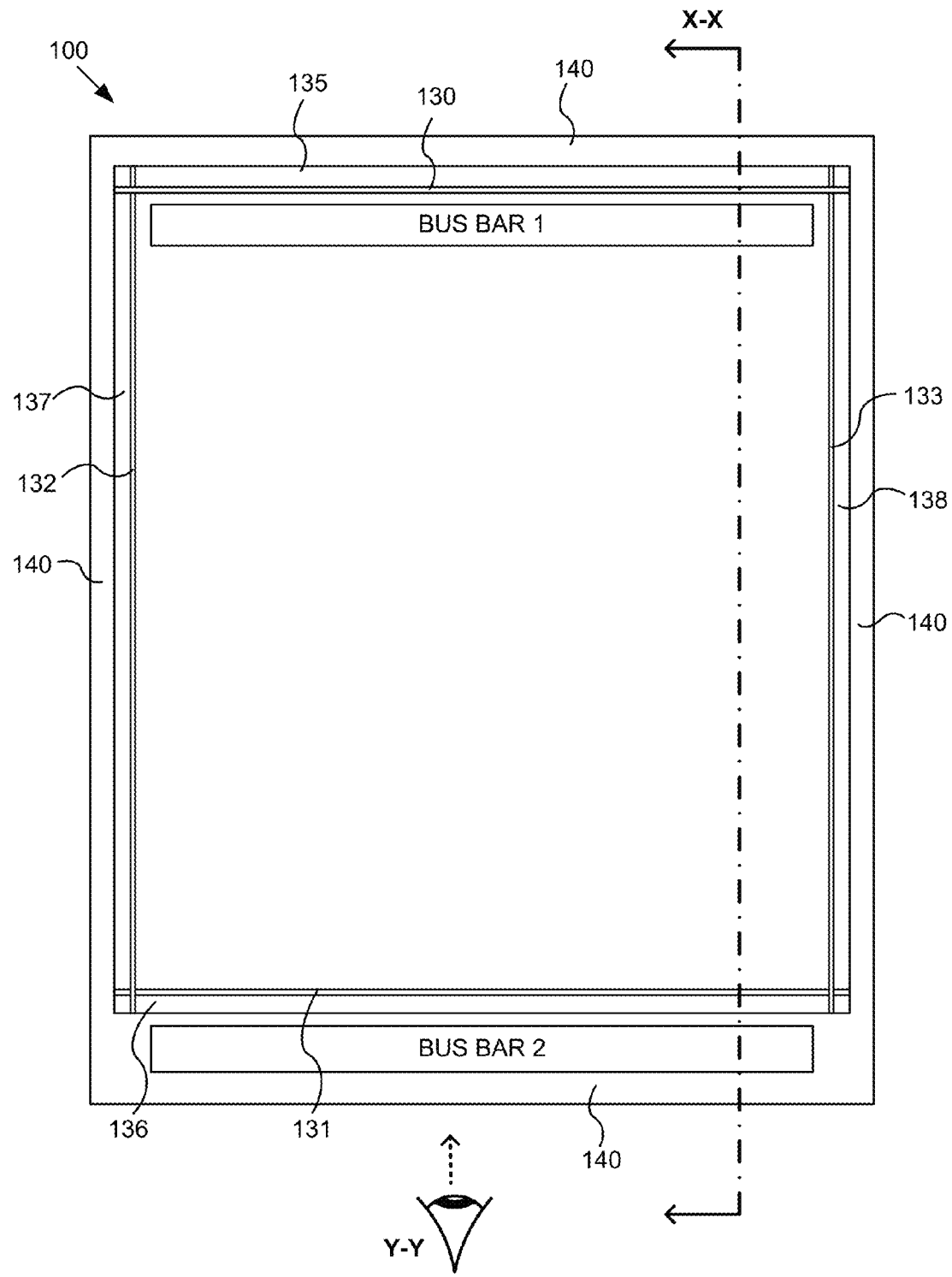

Particular examples of electrochromic devices formed on substrates are described with reference to FIGS. 1A-1C. FIG. 1A is a cross-sectional representation (along cut X-X as depicted in FIG. 1C) of an electrochromic lite, 100, which is fabricated starting with a glass sheet, 105. FIG. 1B shows a different view from Y-Y as depicted in FIG. 1C; i.e., FIG. 1B shows a view of electrochromic lite 100 from the bottom edge and in the plane of the paper (e.g., 90 degrees from the cross-sectional view shown in FIG. 1A). FIG. 1C shows a top-down view of electrochromic lite 100.

FIG. 1A shows an electrochromic lite after edge deletion (described below), laser scribing, and bus bar attachment. Glass sheet 105 has a diffusion barrier, 110, and a first transparent conducting oxide (TCO) layer, 115, on the diffusion barrier. First TCO layer 115 is the first of two conductive layers that form the electrodes of the electrochromic device fabricated on the glass sheet.

In some embodiments, the glass sheet as supplied may include the diffusion barrier layer as well as the first TCO layer. Thus, in some embodiments, an electrochromic stack, 120, and then a second TCO layer, 125, may be formed in the fabrication of electrochromic lite 100. The electrochromic stack is typically a series of layers, e.g., an electrochromic layer, an electrolyte layer, and an ion storage layer; however, in some embodiments electrochromic stack 120 is an electrochromic layer and an ion storage layer with an interfacial region that acts as an electrolyte layer. Examples of electrochromic devices including such stacks are described in U.S. patent application Ser. No. 12/772,055, filed Apr. 30, 2010, titled "Electrochromic Devices," and naming Wang et. al as inventors; the application is incorporated by reference in its entirety herein. In some embodiments, electrochromic stack 120 and second TCO layer 125 are fabricated in an integrated deposition system where glass sheet 105 does not leave the integrated deposition system at any time during fabrication of the stack. In some embodiments, first TCO layer 115 is also formed using the integrated deposition system where glass sheet 105 does not leave the integrated deposition system during deposition of the stack/layers. In some embodiments, all of the layers (diffusion barrier 110, first TCO layer 115, electrochromic stack 120, and the second TCO layer 125) are deposited in the integrated deposition system where glass sheet 105 does not leave the integrated deposition system during deposition of the stack/layers.

After formation of the electrochromic device, edge deletion and laser scribing are performed. FIG. 1A depicts areas, 140, where portions of the electrochromic device have been removed from a perimeter region surrounding the laser scribe trenches, 130, 131, 132, and 133 (see also FIGS. 1B and 1C). The laser scribe trenches pass through the second TCO layer and the electrochromic stack, but not through the first TCO. The laser scribe trenches are made to isolate portions of the electrochromic device, 135, 136, 137, and 138, from the operable electrochromic device. The isolated portions of the electrochromic device are portions that were potentially damaged during edge deletion and/or fabrication. If the edge deletion produces a clean cut edge to the device stack, e.g., using lasers for the removal of material in the edge deletion, then these isolation trenches may not be needed.

In some embodiments, laser scribe trenches 130, 132, and 133 pass through the first TCO layer to aide in isolation of the device. Note that laser scribe trench 131 does not pass through the first TCO layer; otherwise, it would cut off bus bar 2's electrical communication with the first TCO layer and thus the electrochromic stack.

The laser or lasers used for the laser scribing are typically, but not necessarily, pulse-type lasers, for example, including diode-pumped solid state lasers. For example, the laser scribing can be performed using a suitable laser from IPG Photonics (Oxford, Mass.), or from Ekspla (Vilnius, Lithuania). Scribing can also be performed mechanically, for example, with a diamond tipped scribe. One of ordinary skill in the art would appreciate that the laser scribing can be performed at different depths and/or performed in a single process whereby the laser cutting depth is varied, or not, during a continuous (or not) path around the perimeter of the electrochromic device. In some embodiments, the edge deletion is performed to the depth below the first TCO layer. In some embodiments, a second laser scribe is performed to isolate a portion of the first TCO layer near the edge of the glass sheet from that toward the interior, as depicted in FIGS. 1A-C, for example. In some embodiments, this scribe is at least along the edge of electrochromic lite 100 where bus bar 2 is applied to the first TCO layer and is between bus bar 2 and the edge of electrochromic lite 100.

After laser scribing is complete, bus bars are attached. In FIGS. 1A-C, a non-penetrating bus bar 1 is applied to second TCO layer 125. Non-penetrating bus bar 2 is applied to an area where the device was not deposited (for example, from a mask protecting first TCO layer 115 from device deposition), in contact with first TCO layer 115 or, as depicted in FIG. 1A, where edge deletion was used to remove material down to first TCO layer 115. In this example, both bus bar 1 and bus bar 2 are non-penetrating bus bars. A penetrating bus bar is one that is typically pressed into and through the electrochromic stack to make contact with the TCO layer at the bottom of the stack. In some embodiments, a soldering step, where a contact is soldered to a bus bar, may serve to penetrate the electrochromic stack and establish electrical contact to a lower conducting layer. A non-penetrating bus bar is one that does not penetrate into the electrochromic stack layers, but rather makes electrical and physical contact on the surface of a conductive layer, for example, a TCO layer. Both types are suitable for use with the embodiments disclosed herein.

Edge deletion may be performed on a window where edge portions of an electrochromic device are removed prior to integration of the window into the IGU. The edge portions may include, for example, regions of "roll off" where layers of an electrochromic stack that are normally separated contact one another due to non-uniformity in the layers near the edge of the electrochromic device.

Further, edge deletion may be employed for removal of one or more electrochromic device layers that would otherwise extend to underneath the IGU. In some embodiments, isolation trenches are cut and the isolated portions of the electrochromic device on the perimeter of the electrochromic lites are removed by edge deletion. The process of performing edge deletion is, in some embodiments, a mechanical process such as a grinding or sandblasting process. An abrasive wheel may be employed for grinding. In some embodiments, edge deletion is done by laser, where a laser is used to ablate electrochromic material from the perimeter of the electrochromic lite. The process may remove all electrochromic device layers, including the underlying TCO layer, or it may remove all electrochromic device layers except the bottom TCO layer. The latter case is appropriate when the edge deletion is used to provide an exposed contact for a bus bar, which may be connected to the bottom TCO layer. In some embodiments, a laser scribe is used to isolate that portion of the bottom TCO layer that extends to the edge of the glass sheet from that which is connected to the bus bar (sometimes referred to as a bus bar pad or contact pad) in order to avoid having a conductive path to the electrochromic device from the edge of the glass sheet.

When edge deletion is employed, it can be performed before or after the electrochromic lites are cut from the glass sheet (assuming that lites are cut from a larger glass sheet as part of the fabrication process). In some embodiments, edge deletion is performed in some edge areas prior to cutting the electrochromic lites and again after they are cut. In some embodiments, all edge deletion is performed prior to cutting the electrochromic lites. In embodiments employing edge deletion prior to cutting the electrochromic lites, portions of the electrochromic device on the glass sheet can be removed in anticipation of where the cuts (and thus edges) of the newly formed electrochromic lites will be. In most fabrication processes, after edge deletion, bus bars are applied to the one or more electrochromic lites.

Figure 3A:
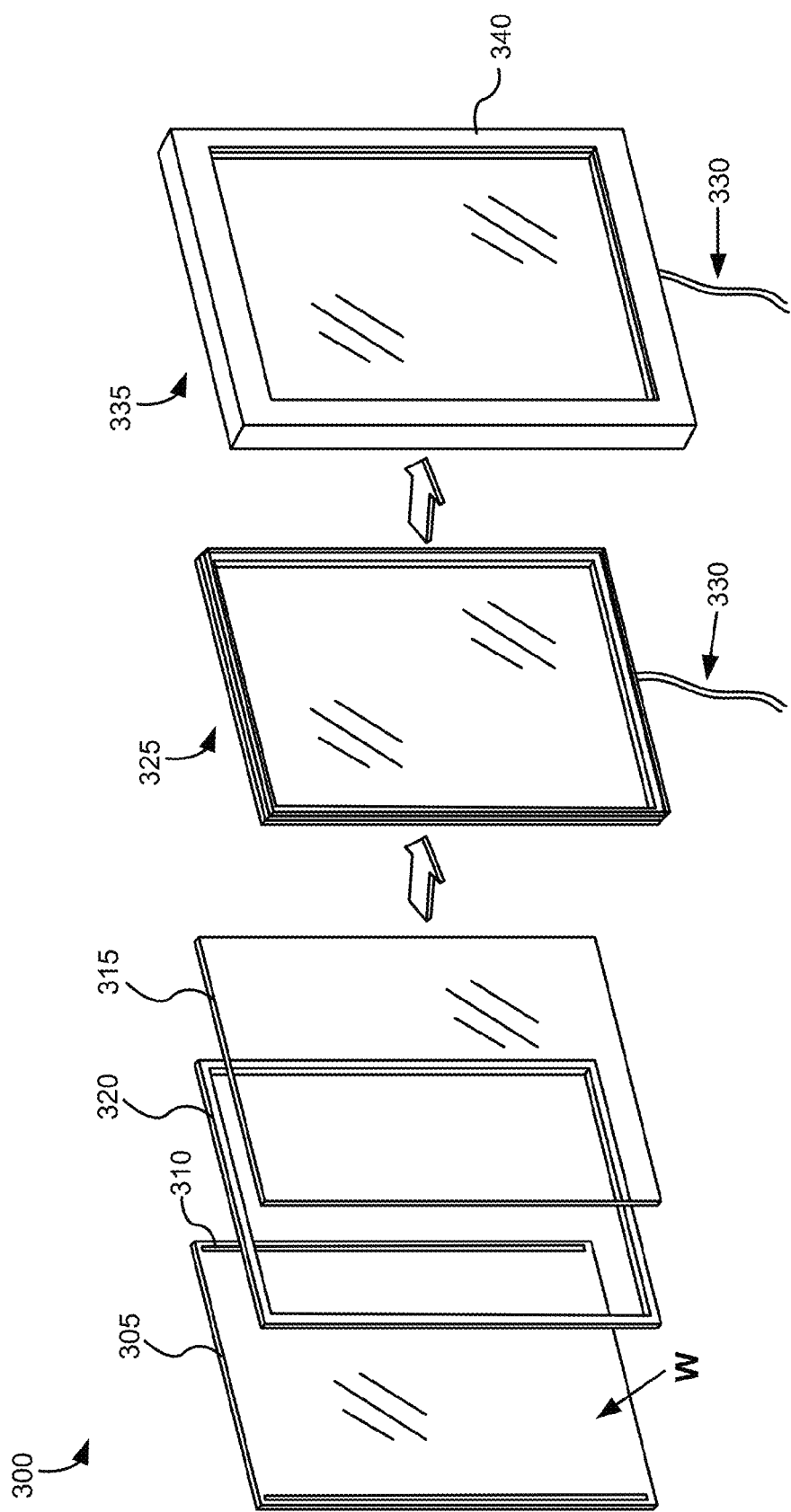
FIG. 3A depicts an example of an electrochromic window fabrication process.

After the electrochromic devices with bus bars are fully assembled on the glass sheets, IGUs are manufactured using the one or more electrochromic lites (e.g., refer to FIG. 3A and the associated description). Typically, an IGU is formed by placing a primary sealing spacer, which may include a gasket or sealing material (e.g., PVB (polyvinyl butyral), PIB (polyisobutylene), or other suitable elastomer) and a rigid spacer around the perimeter of the glass sheet. The primary sealing spacer may also be referred to as a primary sealant. In the disclosed embodiments, the primary sealing spacer includes a metal spacer, or other rigid material spacer, and sealing material between the metal spacer and each glass lite. After the lites are joined to the primary sealing spacer, a secondary seal may be formed around the outer perimeter of the primary sealing spacer. The secondary seal may be, for example, a polymeric material that resists water and that adds structural support to the IGU. Typically, but not necessarily, a desiccant is included in the IGU frame or spacer during assembly to absorb any moisture and/or organic volatiles that may diffuse from the sealant materials. In some embodiments, the primary sealing spacer surrounds the bus bars and electrical leads to the bus bars extend through the seal. Typically, but not necessarily, the IGU is filled with inert gas such as argon. The completed IGU can be installed in, for example, a frame or curtain wall and connected to a source of electricity and a controller to operate the electrochromic window.

Figure 2A:
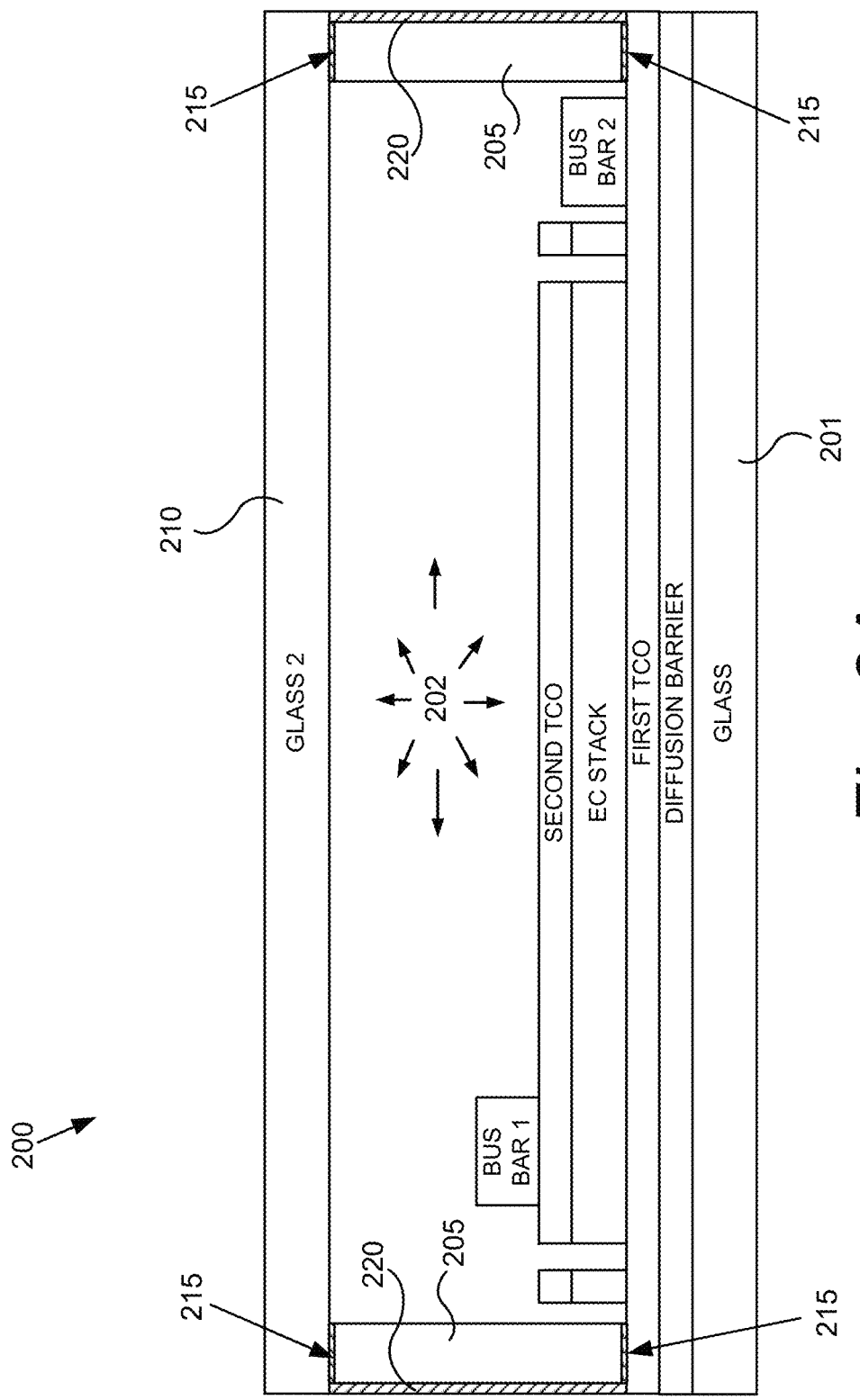
FIGS. 2A and 2B show cross-sectional schematic diagrams of the electrochromic window as described in relation to FIGS. 1A-C integrated into an IGU.
Figure 2B:
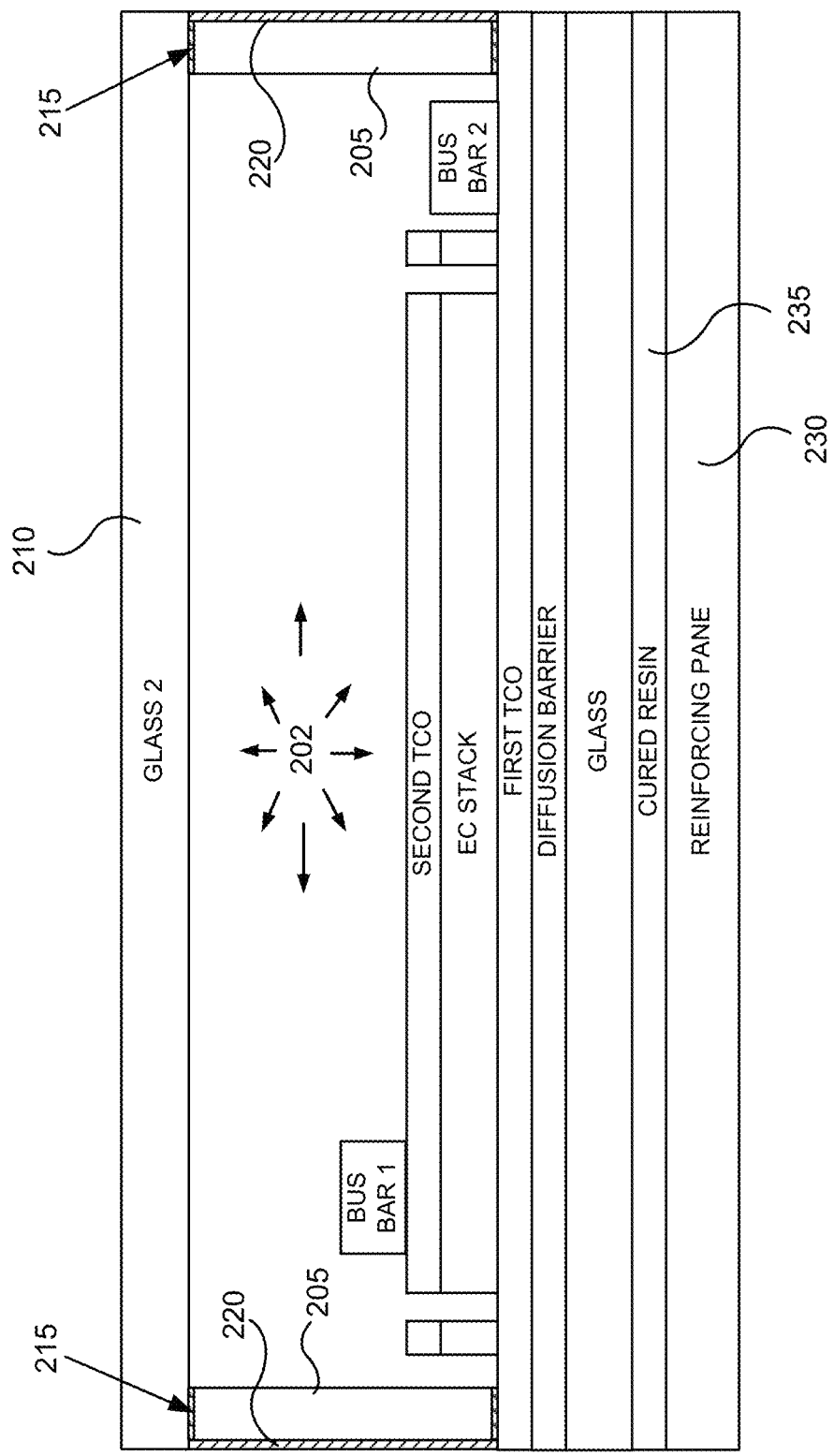

As described above, after the bus bars are connected, the electrochromic lite is integrated into an IGU, which includes, for example, wiring for the bus bars and the like. In the embodiments described herein, both of the bus bars are inside the primary seal of the finished IGU. FIG. 2A shows a cross-sectional schematic diagram of the electrochromic window as described in relation to FIGS. 1A-C integrated into an IGU, 200. A spacer, 205, is used to separate electrochromic lite 201 from a second lite, 210. Second lite 210 in IGU 200 is a non-electrochromic lite, however, the embodiments disclosed herein are not so limited. For example, lite 210 can have an electrochromic device thereon and/or one or more coatings such as low-E coatings and the like. Lite 201 can also be laminated glass, such as depicted in FIG. 2B (lite 201 is laminated to reinforcing pane, 230, via resin, 235). Between spacer 205 and the first TCO layer of the electrochromic lite is a primary seal material, 215. This primary seal material is also between spacer 205 and second glass lite 210. Around the perimeter of spacer 205 is a secondary seal, 220. Bus bar wiring/leads traverse the seals for connection to controller. Secondary seal 220 may be much thicker that depicted. These seals aid in keeping moisture out of an interior space, 202, of the IGU. They also serve to prevent argon or other gas in the interior of the IGU from escaping.

For further context, FIG. 3A depicts an example of an electrochromic window fabrication process, 300. In electrochromic window fabrication process 300 an electrochromic lite, 305, having an electrochromic device (not shown, but for example on surface W) and bus bars, 310, which deliver power to the electrochromic device, is matched with another glass lite, 315. During fabrication of an IGU, 325, a spacer, 320, is sandwiched in between and registered with substrates/lites 305 and 315. IGU 325 has an associated interior space defined by the faces of the windows/lites in contact with spacer 320 and the interior surfaces of the spacer. Spacer 320 is typically a sealing spacer, that is, it includes a spacer and sealing material between the spacer and each substrate where they adjoin in order to hermetically seal the interior region and thus protect the interior region from moisture and the like. Once the glass lites are sealed to the spacer, secondary sealing material may be applied around the perimeter edges of the IGU in order to impart not only further sealing from the ambient, but also further structural rigidity to the IGU. IGU 325 may be wired to a power supply and/or controller via wires, such as wires, 330. The IGU is supported by a frame, 340, to create a window assembly, 335. Window assembly 335 may be separately connected to a controller (not shown). The controller may also be connected to one or more sensors in the window or frame.

Figure 3B:
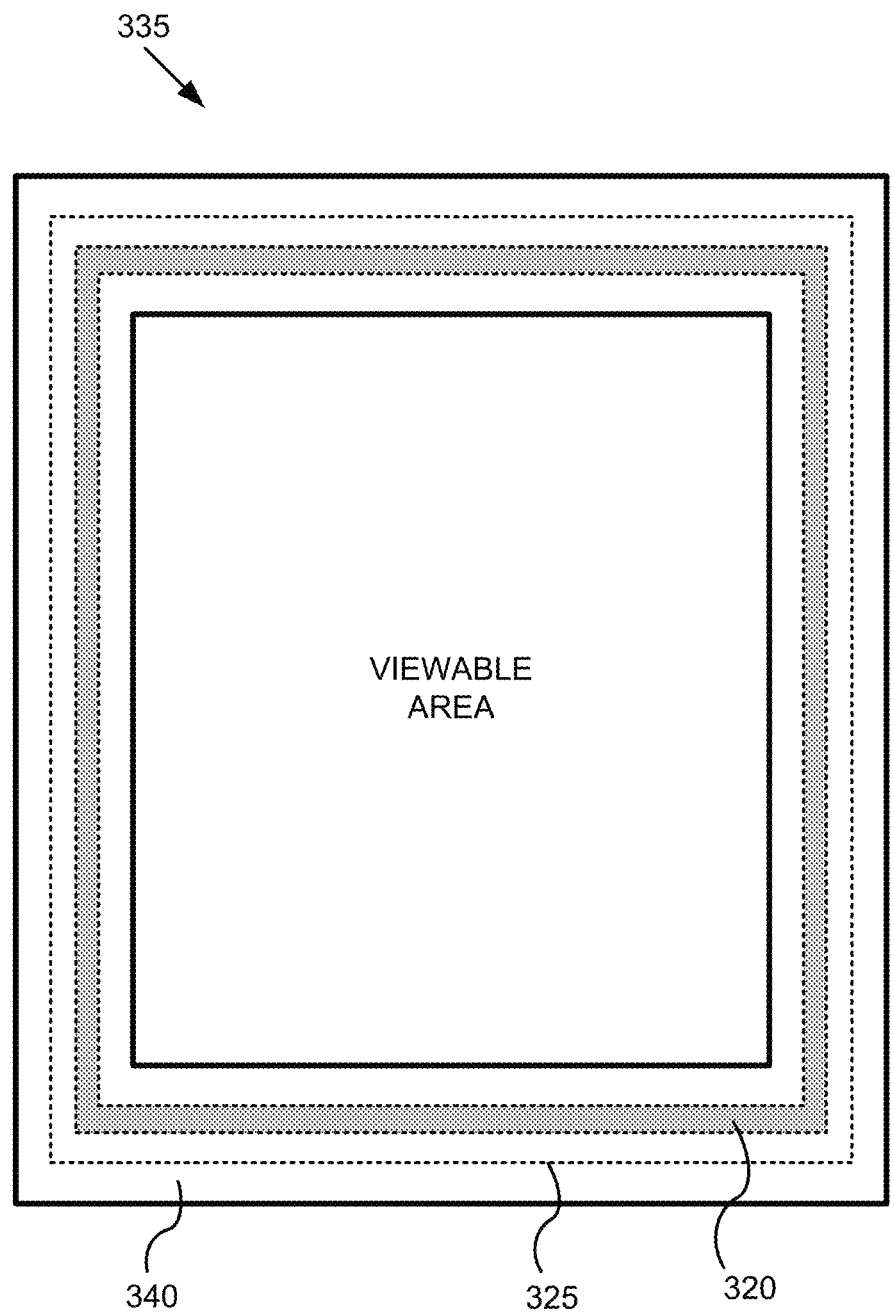
FIG. 3B depicts an example of a window assembly.

FIG. 3B depicts an example of a window assembly, 335, including frame 340. The viewable area of the window assembly is indicated on the figure, inside the perimeter of frame 340 (using a heavy black line). As indicated by dotted lines, inside frame 340 is IGU 325 which includes two glass lites separated by sealing spacer 320, shaded in gray.

In some embodiments, an edge bumper is employed to protect the edges of the glass after incorporation in the IGU. This protection allows the IGU to be safely transported from manufacturer to installation, for example. In some embodiments, the protective bumper is a U-channel cap which fits over the glass edges around the perimeter of the IGU. It may be made from an elastomeric or plastic material. In some embodiments, the edge bumper is a vinyl cap.

Figure 4:
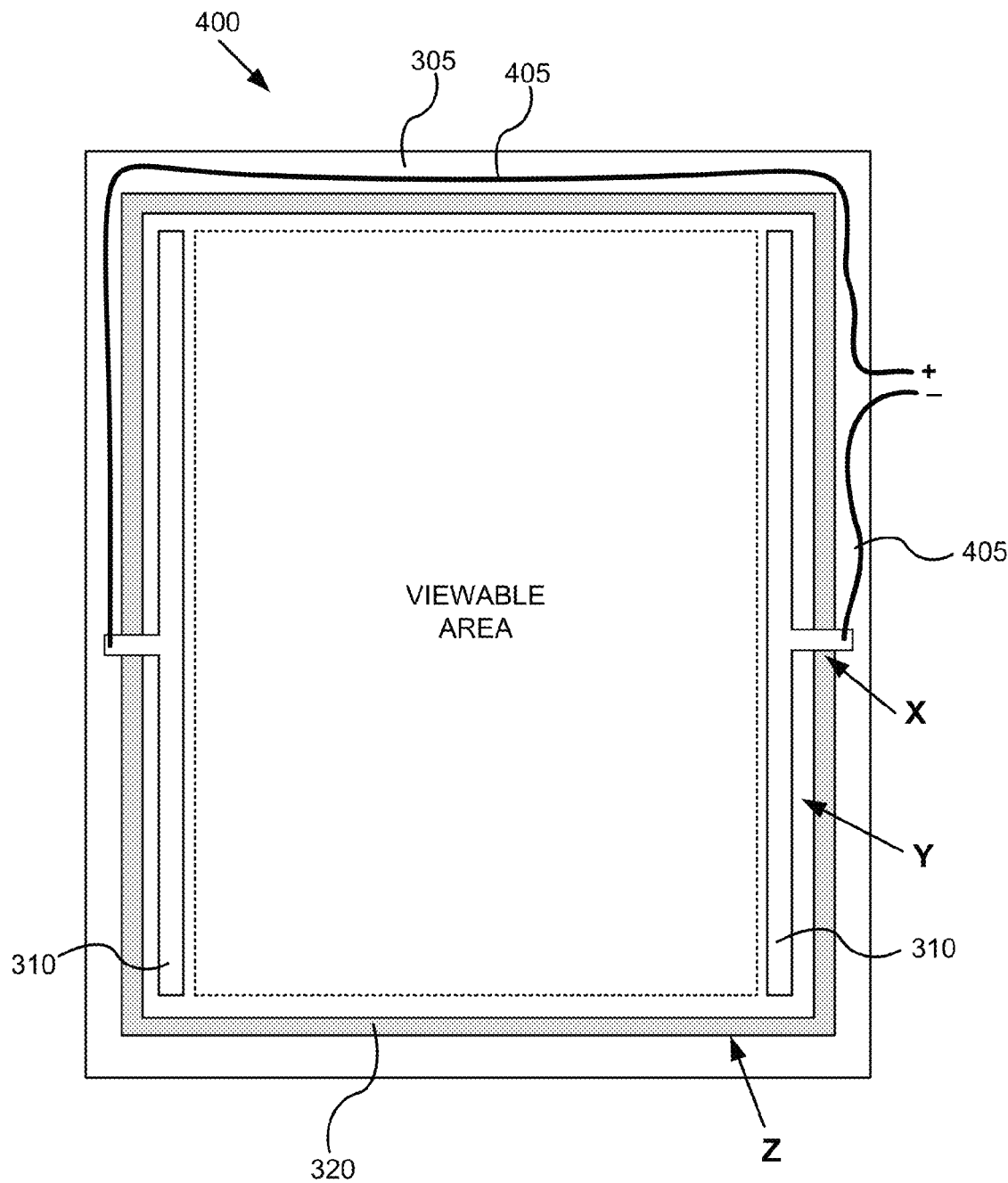
FIG. 4 shows examples of three modes of potential shorting to the spacer and consequent failure of an electrochromic device in an IGU.

FIG. 4 is a facing or front view of an IGU, 400, which includes electrochromic lite 305 as depicted in FIG. 3A. Electrochromic lite 305 has bus bars 310 fabricated on an electrochromic device (not depicted). FIG. 4 shows the relative configurations of the spacer, the electrochromic lite, the wiring, and so forth. Spacer 320 surrounds bus bars 310 and overlays leads to the bus bars. In some embodiments, the bus bar leads may be a conductive ink. Wiring, 405, connects to bus bars 310 via the bus bar leads. Wiring 405 further occupies at least a portion of the secondary seal area and then passes out of IGU 400. In some embodiments, wiring 405 may be insulated (i.e., the wiring may have a conductive metal core covered with an insulating material, for example).

Because the spacer in a conventional IGU is made from a metal, such as a steel hollow bar or a stainless steel hollow bar, for example, it can possibly short out one or more features contained in an electrochromic device employed in an electrochromic window. Using IGU 325 (see FIG. 3A) as an example, lite 315 is pressed together with electrochromic lite 305 with spacer 320 and a primary sealant material there between. With the bus bar leads extending under spacer 320, there is a chance of shorting between the bus bar leads and the spacer.

In some embodiments, rather than bus bar leads traversing the area where the spacer presses against the primary sealant material, wires 405 may traverse the area. However, the compression used to assemble an IGU may compromise the integrity of insulation on wires 405. In some embodiments, wires 405 may be thin, flat wires (e.g., braided wire cabling) with insulation over the wires. In some embodiments, the wires run between the spacer and the lite, rather than leads as depicted in FIG. 4. Even if thin, flat wires are used, there still may be issues with shorting.

FIG. 4 further shows examples of three modes of potential shorting of the electrochromic device to the spacer and consequent failure of the electrochromic device. Reference X illustrates a potential short between the bus bar and the spacer at a "crossover point," e.g., the bus bar lead. The crossover point can be understood as the electrical connection between the bus bar of the electrochromic device and an external connection to the bus bar from outside the interior space of the IGU. Typically, the external connection provides power from a voltage or other power source to the bus bar. The bus bar provides power to one of the two sheet electrodes of the electrochromic device. In the above embodiments, the sheet electrodes are typically transparent conductive oxides (TCOs), such as indium tin oxide (ITO) or TEC (a fluorinated tin oxide conductive layer provided on glass lites marketed under the trademark TEC Glass™ by Pilkington). The contact between the bus bar lead and the spacer shown as reference X is a region where the bus bar lead (or a wire) extends across the spacer from the interior space of the IGU to the secondary seal area. The bus bar lead, which is an extension of the bus bar, is sometimes referred to as a "bus bar exit." Whichever wiring configuration is used, there is a potential for shorting with a conductive spacer. As will be described in more detail below, one mode of addressing this potential problem of an electrical short between the spacer and the bus bar lead is by creating a small notch or "mouse hole" in the underside side of the spacer that contacts the lite in order to allow room for the bus bar lead (or wire) to pass between the lite and the spacer without contacting the spacer.

A second potential short or failure area depicted in FIG. 4 is illustrated by reference Y. In area Y, between the bus bar and the spacer, it is possible that the bus bar itself may contact the conductive spacer. Because the bus bar is a relatively long structure, oriented along one edge of the window, the bus bar could contact a corresponding point on the metal spacer anywhere along the length of the bus bar. Typically the bus bar is situated as close as possible to the spacer without touching it, in order to maximize viewable area of the window. Because of the tight tolerances employed in manufacturing an electrochromic device, it is possible that there will be some minor misalignment of the bus bar and/or the spacer resulting in contact in the area indicated by Y. The bus bar itself typically resides on an inactive area of the electrochromic device, for example, behind a laser scribe line, and the bus bar material used is often light in color. With this also in mind, the bus bar is typically placed very close to the edge of the window at the edge of the electrochromic device. As a consequence, it is typically placed very close to the spacer.

The third mode of potential shorting and failure is illustrated by reference Z. As shown, a contact can occur between the spacer and some amount of the transparent conductive electrode employed in the electrochromic device. While it is typical to remove some or all of the electrochromic device stack, for example, in an edge delete process, it is not uncommon to have some small amount of an underlying conductive film such as ITO or TEC remain near the edge of the device on the window. As described above, the primary sealant, such as PIB or PVB, typically separates the metal spacer bar from the glass lite with the transparent conductive electrode. However, the primary sealant can deform under pressure and it is not uncommon for the sealant to be squeezed out of the seal area over time. As a consequence, there is a significant risk that the spacer will electrically contact some of the transparent conductive electrode and cause a short.

It should be understood that the design placement of the bus bar, the connectors/leads, the location of the conductive electrode layers, etc., are specified with very tight tolerances, e.g., on the order of about a few millimeters or less. It has been found in practice that the specification may not be met. Therefore, each of the three depicted modes of shorting failure represents a significant design challenge. The following discussion of FIGS. 5-11B illustrate certain embodiments that address one or more of these potential modes of failure. One of ordinary skill in the art would appreciate that, where useful, combinations of these embodiments are contemplated as individual embodiments herein. Certain embodiments are described in terms of an IGU; however, one embodiment is a spacer as described herein, or a sub-assembly of an IGU described herein.

Figure 5A:
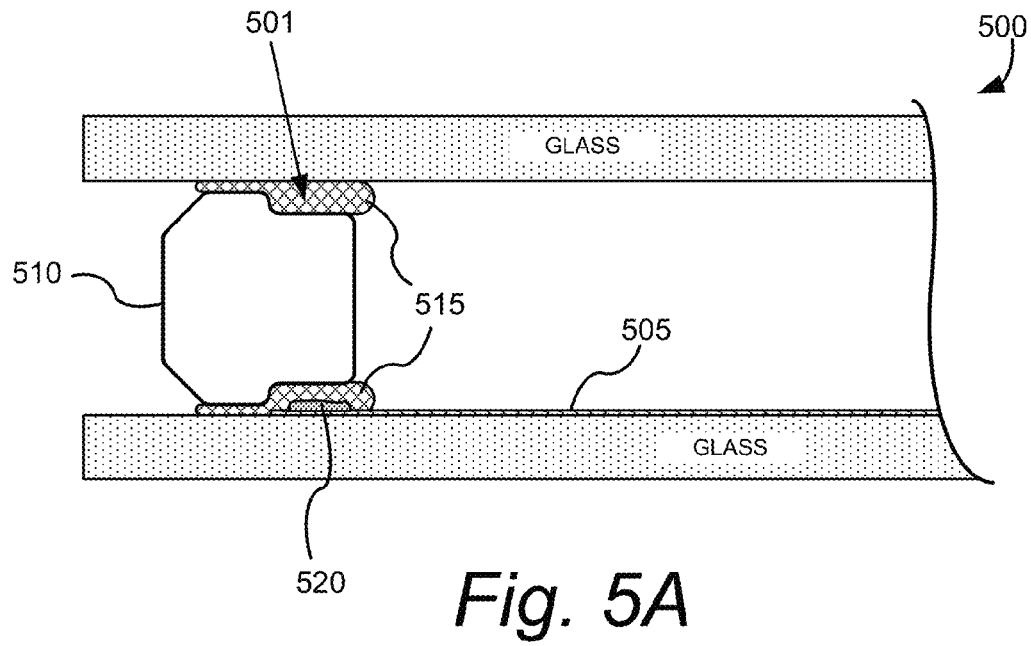
FIG. 5A shows an example of a cross-section of an edge region of an IGU where the spacer of the IGU and the bus bar reside.

FIG. 5A shows an example of a cross section, 500, of an edge region of an IGU where the spacer of the IGU and the bus bar reside. As illustrated, a spacer, 510, is sandwiched between two sheets of glass near the edge of the IGU. In a typical design, the glass interfaces directly with a primary seal material, 515, (e.g., a thin elastomeric layer, such as PIB or PVB), which is in direct contact with spacer 510. In some embodiments, spacer 510 may be metal spacer, such as a steel spacer or a stainless steel spacer, for example. This three-part interface (i.e., glass/primary seal material/spacer) exists on both a top piece of glass and a bottom piece of glass. Spacer 510 may have a hollow structure, as depicted in FIG. 5A. In some embodiments, the spacer may have a substantially rectangular cross section. At a minimum, spacers described herein have at least two surfaces, each substantially parallel to the lites of the IGU in which they are to be incorporated. The remaining cross section, e.g., surfaces of the spacer that face the interior space of the IGU and the exterior, secondary seal area, space may have any number of contours, i.e., they need not be flat, but may be. In the example depicted in FIG. 4, spacer 510 has two surfaces, on each face that forms the primary seal that are substantially parallel to the glass lites of the IGU. In some embodiments, the top and bottom outer corners of the spacer are beveled and/or rounded to produce a shallower angle in these areas. Rounding, beveling, or smoothing may be included to ensure there are no sharp edges that might enhance electrical shorting. An electrochromic device stack, 505, is fabricated on the lower glass lite, as depicted. A bus bar, 520, is located on electrochromic device stack 505 in order to make electrical contact with one of the electrodes of the device. In this example, bus bar 520 is between spacer 510 and the lower glass lite. This is accomplished by configuring one of the aforementioned surfaces below (see top surface of spacer 510) or above (see bottom surface of spacer 510) the other surface on the face of the spacer that forms the primary seal with the glass surface. This configuration of surfaces forms "notch" 501; see further description below. Primary seal material 515 serves as an insulating layer between bus bar 520 and spacer 510.

There are two primary distinctions between a normal spacer design and spacer 510 shown in FIG. 5A. First, spacer 510 is relatively thicker (wider) in the direction parallel to the glass sheet (i.e., a larger footprint as would be typical from the view depicted in FIG. 3B, for example). A conventional metal spacer is approximately 6 millimeters in width. Spacer 510 is about two times to about two and one half times (about 2× to about 2.5×) that width. For example, spacer 510 may be about 10 millimeters to about 15 millimeters wide, about 13 millimeters to about 17 millimeters wide, or about 11 millimeters wide. This additional width may provide a greater margin of error in a sealing operation compared to a conventional spacer.

The second significant distinction of spacer 510 from a conventional spacer is in the use of recesses or notches 501 on the upper and lower inner corners of spacer 510. In some embodiments, a spacer may include two notches, and in some embodiments, the spacer may include one notch. Two notches, e.g., as depicted in FIG. 5A, may be used for an IGU containing two electrochromic lites, or may be useful in fabricating IGUs with only one electrochromic light. When using a spacer with two notches in an IGU containing one electrochromic lite, there is no need for special placement of a single notch toward the electrochromic lite. In some embodiments, a recess or notch may extend from a corner of one side of the rectangular cross section of the spacer to a point along the one side of the rectangular cross section of the spacer. At least one notch provides an area for covering the bus bar formed on the glass surface and/or covering the bus bar formed on electrochromic device stack 505 formed on the glass surface. In some embodiments, the bus bar is about 2 millimeters to about 3 millimeters in width and about 0.01 millimeters to about 0.1 millimeter in height (thickness). The bus bar length depends on the window size. In some embodiments, a bus bar may have a length about the length of the electrochromic device. The added width, along with the "notched" profile of spacer 510 that accommodates the bus bar, creates a region of "encapsulation" whereby the bus bar is unlikely to contact the spacer at any point along the length of the bus bar, but is encapsulated in the primary sealant.

In some embodiments, the portion of the spacer's face that does not include the notch (i.e., the outer portion of the spacer) is approximately the same width as a normal spacer employed in non-electrochromic IGU applications. As depicted in FIG. 5A, bus bar 520 is entirely covered by the spacer 510. As a consequence, the bus bar is not visible to a user of the window.

In FIG. 5A, electrochromic device stack 505 extends underneath bus bar 520 and partially into the region formed by notch 501 in spacer 510. As noted above, an electrochromic device stack typically includes a conductive electrode layer such as ITO or TEC. Electrochromic device stack 505 may be entirely removed from the edge of the glass surface by an edge deletion process, described above. However, the removal by edge deletion may not extend entirely up to the edge of the bus bar, as this would be unacceptable given normal process tolerances. Therefore, electrochromic device stack 505 may extend just slightly beyond bus bar 520, e.g., while still residing in notch 501.

Figure 5B:
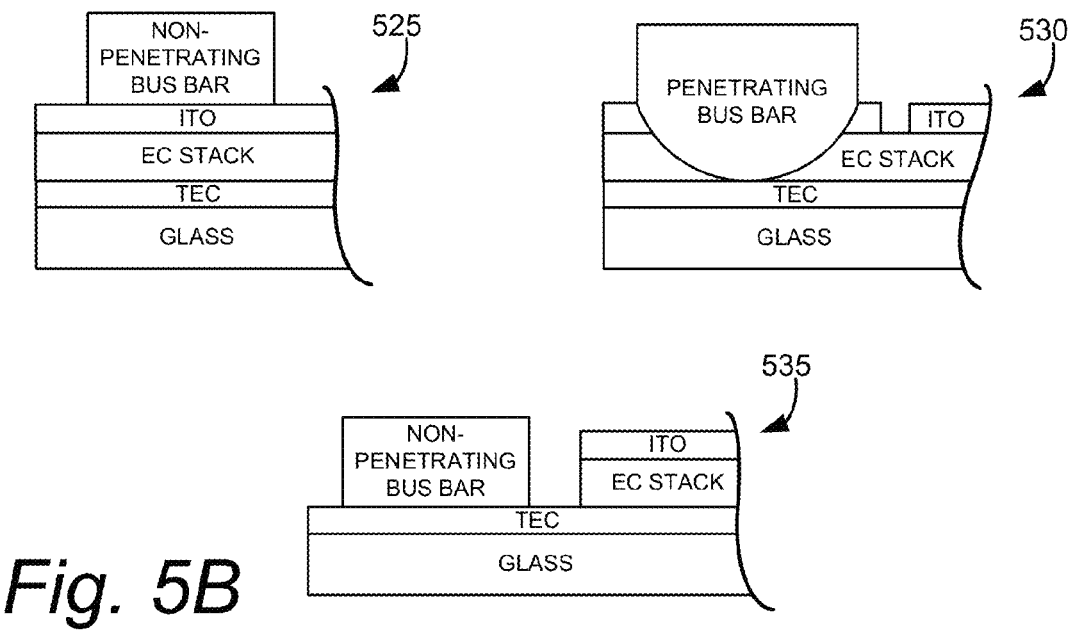
FIG. 5B shows examples of different implementations of bus bars.

FIG. 5B shows examples of different implementations of bus bars. Bus bar 520 may be a non-penetrating bus bar that resides on the ITO of electrochromic device stack 505 (see 525), a penetrating bus bar that makes electrical contact with the TEC of electrochromic device stack 505 (where a scribe electrically isolates the bus bar from shorting to the ITO, see 530), or a non-penetrating bus bar that resides on the TEC (lower electrode), where the layers of electrochromic device stack 505 were removed so that the bus bar could be fabricated directly on the TEC, rather than having to penetrate the stack (see 535).

Spacer 510, which is wider than conventional spacers, as well as notches 501 in spacer 510, provide additional space for primary seal material 515 (e.g., PIB). This feature, along with the notch or notches on the top and/or bottom inside edges of the spacer, give spacer 510 various advantages that are particular to electrochromic devices incorporated in IGUs. For example, a wider primary seal area provides better containment of argon or other gas within the IGU interior as well as protection of the IGU from moisture and other gasses in the ambient environment. The sealing of the IGU secondary seal also may be improved and may provide better structural integrity than a conventional IGU design. Additionally, the IGU may color all the way to the edge defined by the interior perimeter of the spacer. With the bus bars hidden underneath the notch in the spacer, there will be no bright sight lines created either by the inactive area where the bus bar is placed or by the relatively lightly colored material used to fabricate the bus bar.

Figure 5C:
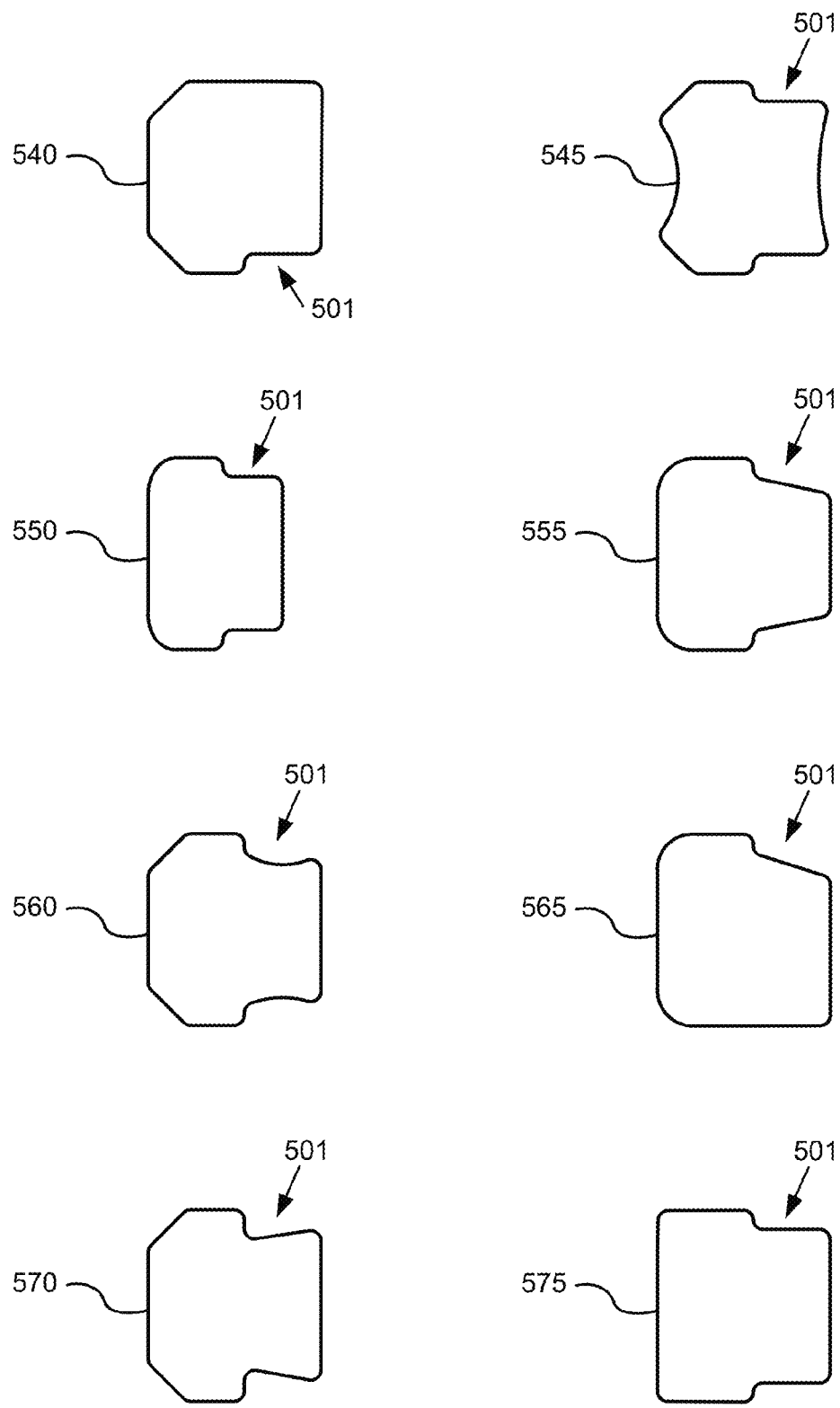
FIG. 5C shows cross-sections of other spacers in accord with embodiments described herein.

Still further, the disclosed embodiment will satisfy industry expectations for an IGU that contains a primary seal having a glass/primary seal material (e.g., PIB)/metal spacer construction. Additionally, because the electrochromic device may employ an edge deletion down to the level of the glass (or the diffusion barrier) and from the glass edge to an area where a notch of the bus bar will form a portion of the primary seal and thus provide more space between the bus bar and spacer, the likelihood of shorting between the electrochromic device electrode and the spacer is greatly reduced. FIG. 5C shows cross-sections of other spacers, 540-575, in accord with embodiments described herein, each spacer having at least one notch 501.

As noted, embodiments described herein, including notched embodiments, may employ a channel or "mouse hole" under an edge of the spacer where a lead or a connector to the bus bar may run to allow connection to an outside power source (described further herein). One embodiment is the spacer as described in relation to FIGS. 5A-C including a channel on one or both faces of the spacer that form the primary seal with the lite or lites. As also noted, the bus bar lead is typically oriented substantially perpendicular to the line of the bus bar itself. It is typically made from the same material as the bus bar (e.g., silver, conductive ink, or other highly conductive material). The channel or mouse hole may be formed in a metal spacer, e.g., stainless steel, or be part of a connector key that joins two ends of a slotted, open, spacer. This is described in more detail below.

Figure 6:
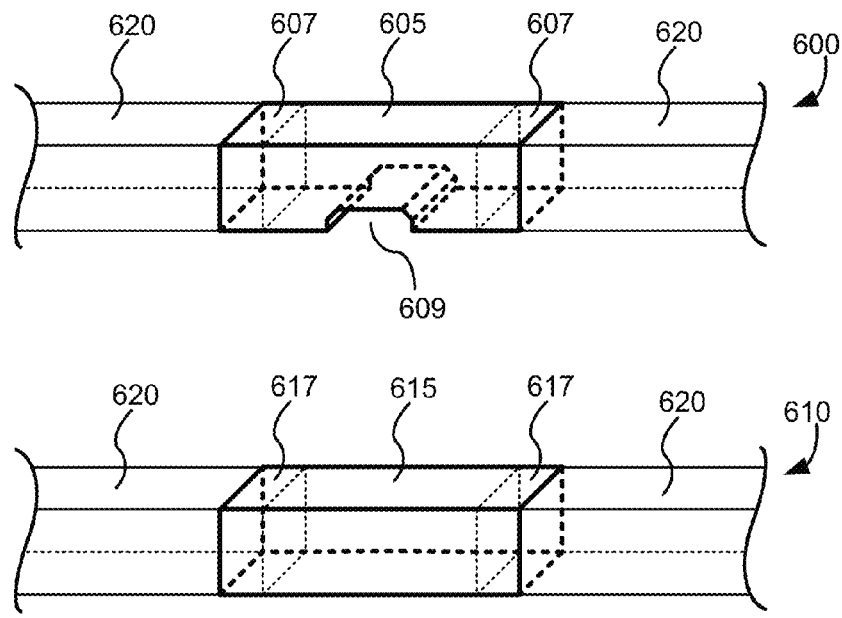
FIG. 6 shows two embodiments of connector keys.

FIG. 6 shows two embodiments of connector keys. A connector key is typically used to join two ends of a spacer. As noted above, a spacer may be made from hollow metal rectangular pieces. One or more of these pieces are bent into an overall rectangular-shaped piece that forms the spacer. This rectangular-shaped spacer is sized and shaped to mate with the perimeter of the glass used to form an IGU. Two ends of the one or more pieces of tubular spacer material are joined by a connector key. For example, an end of the tubular spacer material may slide over a portion of a connector key, and the other end of the tubular spacer material may slide over another portion of the connector key. Alternatively, as depicted in FIG. 6, the ends of the metal spacer slide into the connector key.

Each of the connector keys in FIG. 6 has been modified to accommodate a bus bar lead. In some embodiments, a metal spacer and a primary seal material form a barrier between an interior region of the window assembly and an exterior region of the window assembly. A lead or a wire passes from an electrode of an optically switchable device on the interior region of the window assembly, under a connector key, and to the exterior region of the window assembly. The connector key is not in electrical communication with the lead or the wire.

In embodiment 600, a connector key, 605, joins two ends, 620, of the spacer. In some embodiments, the spacer may be a metal spacer, such as a steel spacer or a stainless steel spacer, for example. In some embodiments, the spacer may have a substantially rectangular cross section. In some embodiments, the spacer may be hollow. The two ends of the spacer, 607, slide into the respective ends of connector key 605. The connector key and spacer are configured so that when joined, the surfaces that are to come into contact with the glass are substantially co-planar. Connector key 605 has a middle section that is made from a metal, particularly a crimpable metal, such as steel or stainless steel, for example. The bottom portion of the middle region of connector key 605 is made from this crimpable metal and is in fact crimped to produce the channel 609 or mouse hole under which the bus bar lead passes. Of course, connector key 605 could be cast or machined to achieve the same result, but stamped or crimped metal is more economical.

In some embodiments, instead of a bus bar lead passing under channel 609, wiring for an electrode may pass under channel 609. For example, in some embodiments, the wire may be thinner than the thickness (i.e., height) of the channel. In some embodiments, when a thin wire is used, the thickness (i.e., height) of the channel may be reduced.

In embodiment 610, a connector key, 615, joins two ends, 620, of the spacer. The two ends of the spacer, 617, slide into the ends of connector key 615. Connector key 615 is an electrically non-conductive or insulating material (e.g., a plastic). Connector key 615 may or may not have a channel or mouse hole cut into it. Typically, such a channel will be unnecessary because connector key 615 is a non-conductive or insulating material, thereby eliminating the possibility of a short between the connector key and the bus bar lead. Thus, the connector key and the lead will not be in electrical communication.

It should be noted that the connector key normally sits at a random location in the spacer. This is because the tubular metal pieces used to make the spacer typically come in standard or fixed lengths. These lengths may be used to construct a rectangular spacer of effectively arbitrary size, as dictated by the size of the window and the associated IGU. In accordance with the embodiments shown FIG. 6, the spacer may be constructed in a manner in which the connector key lines up with at least one of the bus bar leads. In some embodiments, the spacer is designed so that two separate connector keys are specifically aligned to coincide with the position of the two bus bar leads at opposite sides of the electrochromic device. In some embodiments, one of the connector keys is forced into alignment on the spacer with the bus bar lead. In such embodiments, the opposite bus bar lead may pass through a channel created in the body of the tubular metal used to make the spacer. Such a channel may be created by, e.g., forming a dent or a crimp in the tubular metal piece at a location coinciding with the bus bar lead.

In some other embodiments, the spacer is constructed using conventional connector keys. The spacer may then be dented or crimped at the locations where the bus bar lead passes.

Figure 7:
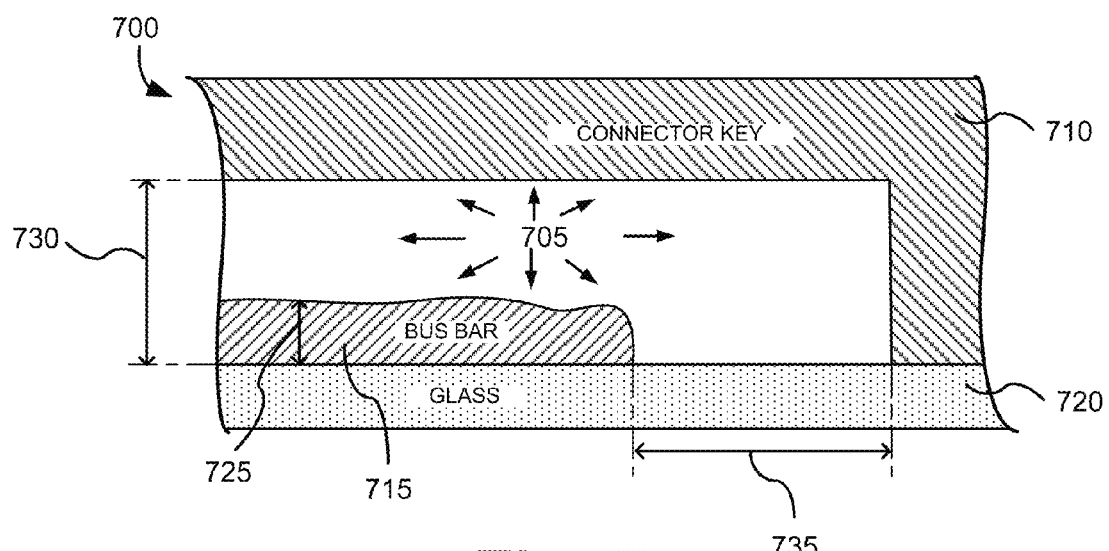
FIG. 7 shows an example of a detailed cross-sectional view of a crimped connector key aligned on a glass sheet with an electrochromic device fabricated thereon.

FIG. 7 shows an example of a detailed cross-sectional view of a crimped connector key aligned on a glass sheet with an electrochromic device fabricated thereon. Particularly, the detailed view, 700, shows a channel (mouse hole), 705, in the middle portion of a connector key, 710, where a bus bar lead, 715, on a glass lite, 720, passes through the channel. Various sample dimensions are provided in FIG. 7. It should be understood that these are only examples and that many other dimensions may be appropriate. In some embodiments, bus bar lead 715 may have a height, 725, of about 0.05 millimeters to about 0.1 millimeters. In some embodiments, channel 705 may have a height, 730, of about 0.1 millimeters to about 1 millimeter. In some embodiments, channel 705 may have a width in connector key 710 of about 4.5 millimeters to about 10 millimeters. In some embodiments, a clearance, 735, that may be desired on either side of bus bar 715 may be about 1.5 and about 2.5 millimeters.

A crimping process that may be used to form a crimped metal connector key may have tolerances associated with the process. Therefore, the channel formed in a connector key may be specified to be somewhat larger than what is desired to account for the tolerances in the process.

Figure 8:
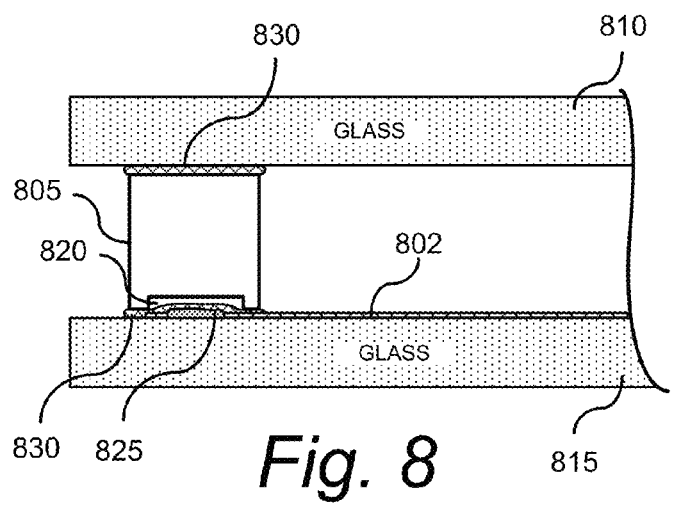
FIG. 8 shows an example of a cross-sectional illustration of a spacer which has a notch on the bottom to accommodate the full length of the bus bar.

FIG. 8 shows an example of a cross-sectional illustration of a spacer which has a notch on the bottom to accommodate the full length of the bus bar. As shown in FIG. 8, a spacer, 805, is between two glass lites, 810 and 815. In some embodiments, spacer 805 may be a metal spacer, such as a steel spacer or a stainless steel spacer, for example. In some embodiments, spacer 805 may have a substantially rectangular cross section. In some embodiments, spacer 805 may be hollow. Spacer 805 includes a notch or recess, 820, to accommodate a bus bar, 825. Notch or recess 820 may form a channel that accommodates the length of bus bar 825. Notch 820 should be distinguished from a channel or a "mouse hole" in the spacer which may accommodate a bus bar lead. An electrochromic device stack, 802, is fabricated on glass lite 815. Bus bar 825 located on electrochromic device stack 802 makes electrical contact with one of the electrodes of electrochromic device stack 802.

Notch 820 in spacer 805 resides in the middle of the underside of spacer 805. The dimensions of notch 820 are suitable to accommodate bus bar 825, factoring in tolerances of the process used to form the notch, as discussed above. In some embodiments, the notch width is about 2 millimeters to about 5 millimeters, and the notch height is about 0.1 millimeters to 1 millimeter. In some embodiments, the notch width is about 3 millimeters to 4 millimeters, and the notch height is about 0.1 millimeter to about 0.5 millimeters.

Comparing notch 820 shown in FIG. 8 to notch 501 shown in FIG. 5A, notch 820 is in the middle of the underside of the spacer and notch 501 is at the interior edge of the underside of the spacer. In other regards, however, the embodiment shown in FIG. 8 may be similar to the embodiment shown in FIG. 5A. For example, many of the dimensions and other design features described with respect to FIG. 5A may apply equally to FIG. 8. Spacer 805 may be relatively thicker (wider) in the direction parallel to the glass sheet compared to conventional metal spacers. A conventional metal spacer is approximately 6 millimeters in width. Spacer 805 is about two times to about two and one half times (about 2× to about 2.5×) that width. For example, spacer 805 may be about 10 millimeters to about 15 millimeters, about 13 millimeters to about 17 millimeters, or about 11 millimeters wide. This additional width may provide a greater margin of error in a sealing operation compared to a conventional spacer. In some embodiments, the bus bar is about 2 millimeters to about 3 millimeters in width and about 0.01 millimeters to about 0.1 millimeter in height (thickness). The bus bar length depends on the window size. In some embodiments, a bus bar may have a length about the length of the electrochromic device. The basic IGU primary seal is comprised of interfaces between glass lites 810 and 815 and primary seal material (e.g., PIB), 830, and between primary seal material 830 and spacer 805.

In some embodiments, the channel for the bus bar lead is located as in the embodiment described with respect to FIGS. 6 and 7, but need only penetrate part way under the spacer because the bus bar resides midway underneath the spacer. In some embodiments, the bus bar lead channel resides on an outside edge of the spacer or on an outside edge of a corner of the spacer.

In some embodiments, the electrochromic device stack 802 when in a colored state may color all the way under the spacer such that electrochromic device stack 802 is substantially uniformly colored. Further, the bus bar may not be visible.

Figure 9:
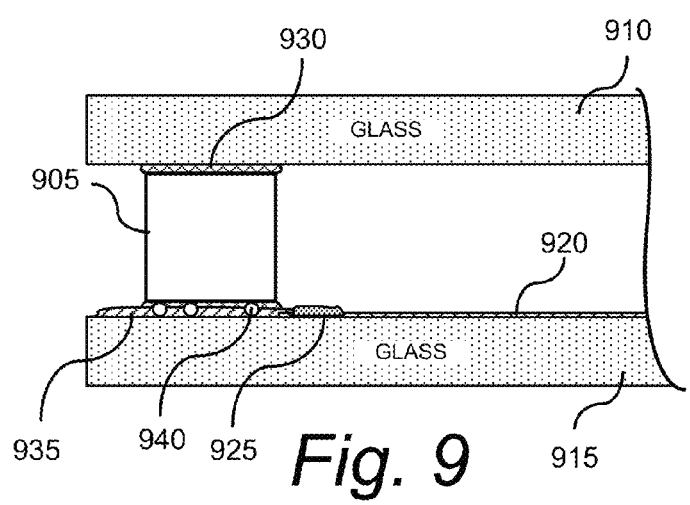
FIG. 9 shows an example of a cross-sectional illustration of a spacer in which the primary seal material (e.g., PIB) is modified to resist compression.

FIG. 9 shows an example of a cross-sectional illustration of a spacer in which the primary seal material (e.g., PIB) is modified to resist compression. With the primary seal material modified to resist compression, there may be reduced chances of the spacer contacting the bus bar and creating a short. As shown in FIG. 9, a spacer, 905, is between two glass lites, 910 and 915. In some embodiments, spacer 905 may be a metal spacer, such as a steel spacer or a stainless steel spacer, for example. In some embodiments, spacer 905 may have a substantially rectangular cross section. In some embodiments, spacer 905 may be hollow. An electrochromic device stack, 920, is fabricated on glass lite 915. A bus bar, 925, located on electrochromic device stack, 920, makes electrical contact with one of the electrodes of the device. In some embodiments, a bus bar may have a length about the length of the electrochromic device stack. A primary seal material (e.g., PIB), 930, joins glass lite 910 to spacer 905. A primary seal material (e.g., PIB), 935, joins glass lite 915 to spacer 905. Primary seal material 935 is impregnated with mechanical supports 940 or other support material that may prevent spacer 905 from being forced into a position where it approaches the glass lite 915 surface and possibly into contact with bus bar 925. Mechanical supports 940 may include electrically non-conductive or insulating particles, such as glass particles, plastic particles, polycarbonate particles, or ceramic particles, for example. In some embodiments, the non-conductive or insulating particles may be spheres or may be substantially spherical. Such particles may impact or otherwise be compressed into a bus bar or bus bar lead, but since they are non-conductive and spaced apart within the sealant matrix, there is no chance of shorting as the particles physically prevent contact between the spacer and the conductive components of the electrochromic device. The particles should be of sufficient size to prevent this physical contact, while generally having an average diameter that is smaller than the width of the spacer so as to avoid traversing the width of the spacer and compromising the primary seal integrity. In one embodiment, the particles are spheres having an average diameter of about 0.5 millimeters to about 3 millimeters, in another embodiment about 0.5 millimeters to about 1.5 millimeters, and in yet another embodiment about 0.5 millimeters to about 1 millimeter.

In some other embodiments, instead of impregnating the primary seal material with mechanical supports, the primary seal material is made more viscous or mechanically resistant to compression. This may be accomplished by, for example, increasing the cross-linking in the primary seal material when the primary seal material is a polymeric material.

Of course, as with the other designs, some provision may be made for passing the bus bar lead underneath the spacer. This can be accomplished with a modified connector key or a channel/tunnel under a portion of the spacer, as described above.

Figure 10:
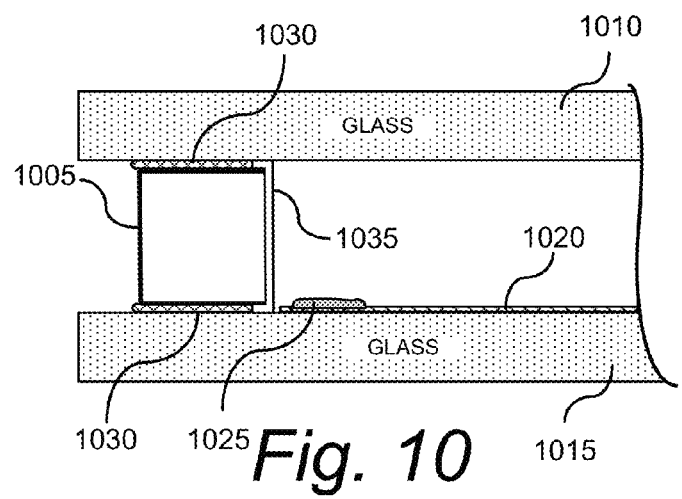
FIG. 10 shows an example of a cross-sectional illustration of a spacer in which the spacer itself is modified so that one of its four walls is made of an electrically non-conductive or insulating material.

FIG. 10 shows an example of a cross-sectional illustration of a spacer in which the spacer itself is modified so that one of its four walls is made of, or coated with, an electrically non-conductive or insulating material. The non-conductive or insulating material may be, for example, a polymeric material or a plastic. As shown in FIG. 10, a spacer, 1005, is between two glass lites, 1010 and 1015. In some embodiments, spacer 1005 may have a substantially rectangular cross section. An electrochromic device stack, 1020, is fabricated on glass lite 1015. A bus bar, 1025, located on electrochromic device stack 1020 makes electrical contact with one of the electrodes of the device. In some embodiments, a bus bar may have a length about the length of the electrochromic device stack. A primary seal material (e.g., PIB), 1030, joins glass lites 1010 and 1015 to spacer 1005.

Spacer 1005 is a hollow spacer with three sides of the spacer made from a metal (e.g., steel or stainless steel) and one side, 1035, is made out of an electrically non-conductive material. The electrically non-conductive or insulating material may be a polymeric material or a plastic, for example. Side 1035 is a c-shaped piece which mates with the metal portion (e.g., much like the U-channel described above with regard to protecting the IGU, but smaller so as to fit within the IGU, as part of the spacer). Together, the metal and plastic portions form a tubular structure as with a conventional all-metal spacer. Spacers of the type depicted in FIG. 10 are available from Technoform (of Twinsburg, Ohio).

Side 1035 of spacer 1005 faces towards the inside of the IGU, and is therefore the portion of spacer 1005 that comes into closest proximity with bus bar 1025. In accordance with this embodiment, if spacer 1005 is moved into a position where it effectively touches glass lite 1015 and possibly bus bar 1025, side 1035, which is insulating, will contact bus bar 1025. With side 1035 contacting bus bar 1025, shorting between the metal portions of spacer 1005 and bus bar 1025 is avoided.

Of course, as with the other designs, some provision may be made for passing the bus bar lead underneath the spacer. This can be accomplished with a modified connector key or a channel/tunnel under a portion of the spacer, as described above.

Figure 11A:
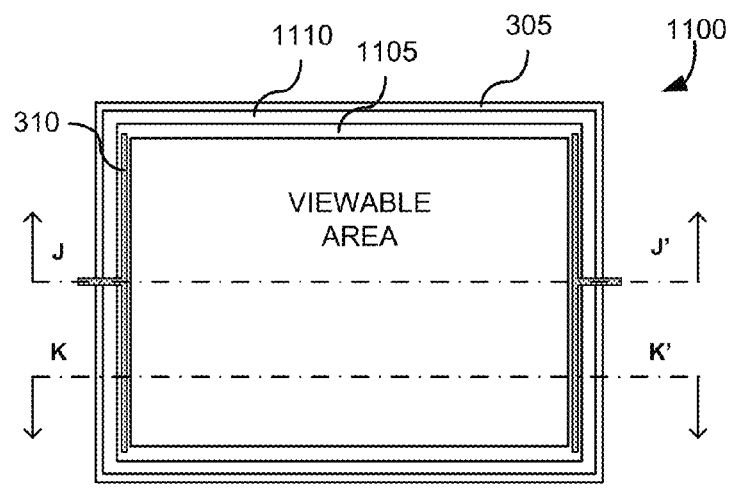
FIGS. 11A-11C show examples of diagrams of an IGU with a two-part spacer.
Figure 11A:
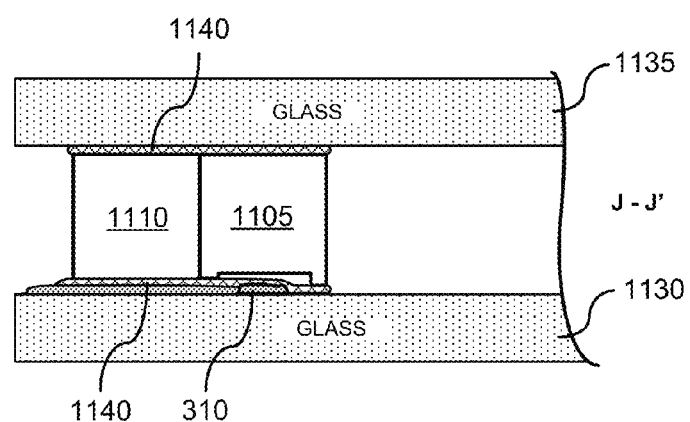
Figure 11A:
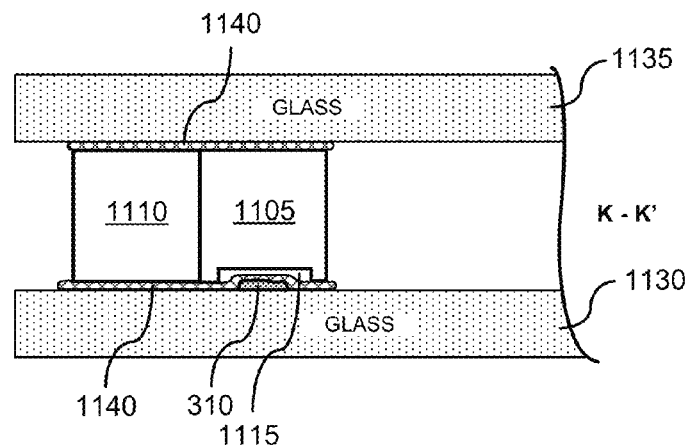
Figure 11B:
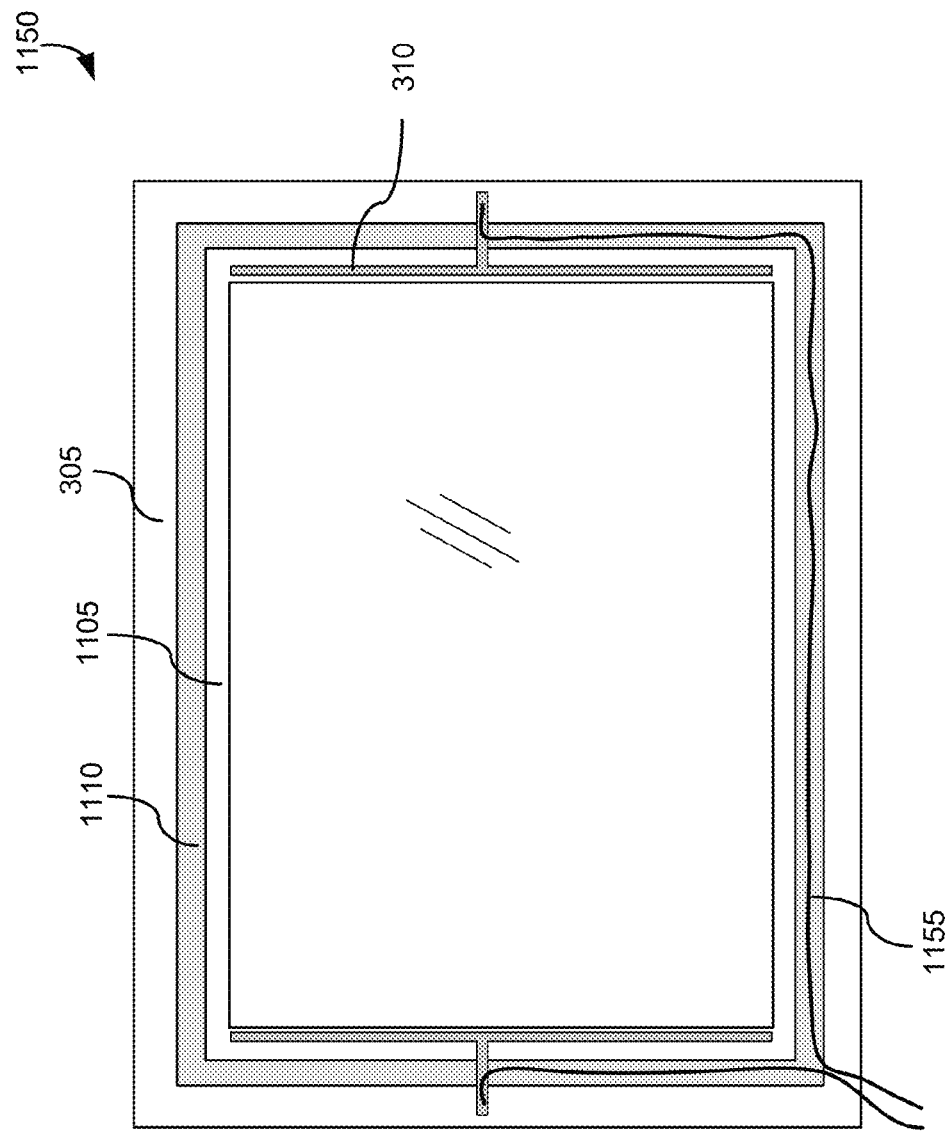
Figure 11C:
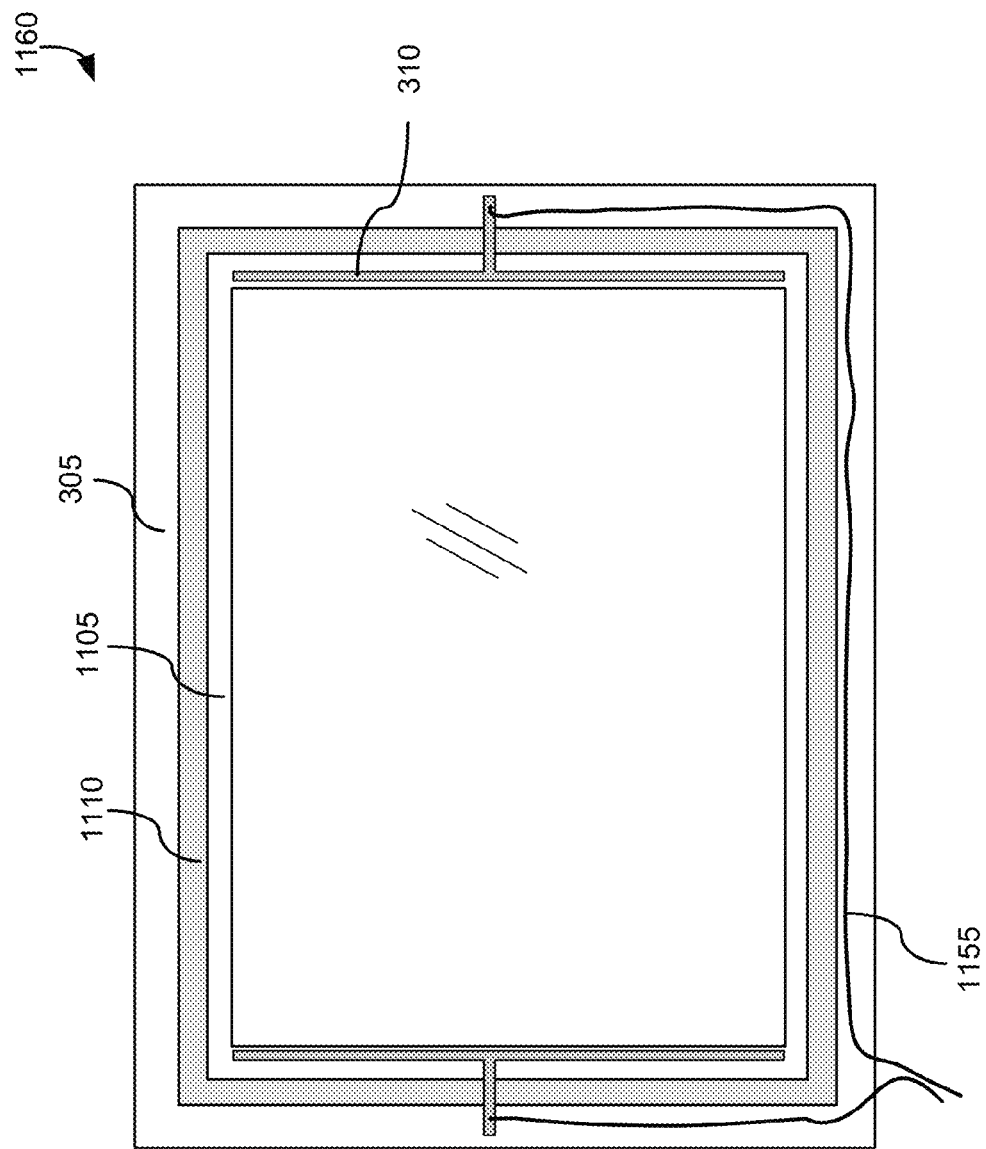

FIGS. 11A-11C show examples of diagrams of an IGU with a two-part spacer. The IGU, 1100, shown in FIG. 11A includes electrochromic lite, 305, as depicted in FIG. 3A. Electrochromic lite 305 has bus bars, 310, fabricated on an electrochromic device (not depicted). In some embodiments, a bus bar may have a length about the length of the electrochromic device. IGU 1100 includes a two-part spacer, including an interior electrically non-conductive or insulating portion or spacer, 1105, and an exterior metal portion or spacer, 1110. In some embodiments, non-conductive or insulating spacer 1105 and metal spacer 1110 may have substantially rectangular cross sections. Non-conductive or insulating spacer 1105 may be made from a polymeric material, a plastic material, or a foam material, for example. In some embodiments, the non-conductive or insulating spacer 1105 is a Triseal spacer available from Edgetech USA (of Cambridge, Ohio). Metal spacer 1110 may be made from steel or stainless steel, for example. Metal spacer 1110 may be a conventional spacer. Cross section J-J' includes a channel in both non-conductive or insulating spacer 1105 and metal spacer 1110 for the bus bar leads. Cross section K-K' does not include a channel.

As shown in cross section K-K', non-conductive or insulating spacer 1105 includes a notch or recess, 1115, to accommodate bus bar 310. The notch may form a channel in a side of the non-conductive or insulating spacer. An electrochromic device stack (not shown) is fabricated on glass lite 1130. Bus bar 310 located on the electrochromic device stack makes electrical contact with one of the electrodes of the device. With non-conductive or insulating spacer 1105 situated on top of bus bar 310, the risk of a short between bus bar 310 and metal spacer 1110 is reduced. An edge delete operation may still be performed on glass lite 1130 down to the glass so that metal spacer 1110 does not contact the conductive electrodes of the electrochromic device stack. The IGU primary seal is comprised of interfaces between glass lites 1130 and 1135 and primary seal material (e.g., PIB), 1140, and between primary seal material 1140 and non-conductive or insulating spacer 1105 and metal spacer 1110.

In some embodiments, metal spacer 1110 may have about the same width as a conventional spacer; i.e., about 6 millimeters wide. In some embodiments, metal spacer 1110 may have a smaller width than a conventional spacer. For example, metal spacer 1110 may be about 4 millimeters wide. Regardless of whether metal spacer 1110 has the same width or has a smaller width than a conventional spacer, the overall design of metal spacer 1110 may be similar in many regards to a conventional spacer.

Cross section J-J' shows a channel for the bus bar lead. Specifically, metal spacer 1110 includes a raised portion compared to non-conductive or insulating spacer 1105. The raised portion of metal spacer 1110 effectively forms the channel or mouse hole under which the bus bar leads passes to avoid electrical contact with metal spacer 1110.

One advantage of the embodiments shown in FIGS. 11A and 11B is the incorporation of a relatively wide spacer including non-conductive or insulating spacer 1105 and metal spacer 1110. The wide spacer provides additional area for the primary seal as compared to a conventional metal spacer. As explained above, this additional seal area, which includes primary seal material 1140, can better protect the IGU interior from moisture and other ambient gasses, as well as prevent argon or other gas in the interior of the IGU from escaping.

In some embodiments, non-conductive or insulating spacer 1105 includes a desiccant. In conventional IGUs, a desiccant is provided in the interior of the metal spacer. Therefore, the metal spacer maintains its integrity in the IGU. For example, the metal spacer cannot include any holes to the outside environment which would permit direct contact with the desiccant when a desiccant is provided in the interior of the metal spacer. Typically, there are one or more holes used to introduce desiccant into the spacer, but these are sealed after the desiccant is introduced.

The metal spacer may include holes to accommodate the wiring to connect the electrochromic device bus bars with a power source. The wires can be fed through the interior of the metal bus bar. These holes may be sealed around the wires to secure the desiccant's function in the metal spacer. FIG. 11B shows an example of a diagram of an IGU in which wiring for an electrochromic device is inside the metal spacer. As shown in FIG. 11B, IGU 1150 includes electrochromic lite 305 with bus bars 310 fabricated on an electrochromic device (not depicted). IGU 1150 includes a two-part spacer, including an interior non-conductive or insulating spacer 1105 and an exterior metal spacer 1110. Wires 1155 are in electrical contact with leads from bus bars 310. The wires are shown as being in the interior of metal spacer 1110 and exit from metal spacer 1110, providing electrical communication from the interior of IGU 1150 to the exterior of IGU 1150. FIG. 11C shows an alternative embodiment, 1160, where the wires run in the secondary seal area, external to both spacers.

In some embodiments, the non-conductive or insulating spacer and the metal spacer may form barrier between an exterior region and an inter region of the IGU. The metal spacer may include two holes, with a wire in electrical contact or communication with an electrode of an electrochromic device passing through the first hole, though the hollow metal spacer, and out of the second hole. The wire may provide electrical communication from the exterior region of the IGU to the interior region of the IGU.

The manufacturing advantage of the embodiment shown in FIG. 11B is that a spacer can be fabricated from the metal rectangular tubular portion in which the wires have already been fed. These metal rectangular tubular portions are normally provided as linear sections which are subsequently bent into the rectangular shape of the spacer. If the wiring is provided in the linear sections prior to bending, the difficulty of feeding a metal wire through bent portions of the metal rectangular tubes is avoided. During manufacturing, and after the wiring is connected to the bus bar through the metal portion of the spacer, the holes in the metal tubular portion through which the wires are fed can be plugged with a sealant, such as PIB, for example.

In some other embodiments, the entire spacer may be made from a material that is electrically non-conductive (i.e., electrically resistive or electrically insulating) and therefore does not exhibit any of the three modes of shorting illustrated in FIG. 4. Examples of such materials that may be used for a spacer include plastic materials, polymeric material, foam materials, and hard rubber materials. As an example, a foam spacer similar to a Triseal spacer (Cambridge, Ohio), as mentioned above, may be used. When an electrically resistive spacer is used, it may be wider such that it occupies about 5 millimeters to about 10 millimeters of the outer edge of the IGU. This embodiment does not include a metal spacer, and the non-conductive material may be sufficiently rigid and strong to serve the role of a spacer. In some embodiments, the non-conductive spacer includes a desiccant and/or wiring, as described and illustrated in the context of FIGS. 11A-11C.

In some embodiments, a metal spacer has an electrically non-conductive or insulating outer coating (i.e., an electrically resistive outer coating) but may otherwise be similar in design and structure to a conventional spacer. In some embodiments, the metal spacer may have a substantially rectangular cross section. In some embodiments, the non-conductive outer coating may be on at least one side of the substantially rectangular cross section of the metal spacer. In some embodiments, the non-conductive outer coating may be on all four sides of the substantially rectangular cross section of the metal spacer. In some embodiments, the metal spacer may include a channel configured to accommodate an electrode of an optically switchable device on one of the glass lites.

For example, one embodiment is metal spacer coated on one or more sides with an insulating (non-electrically conductive) coating. The insulating coating may be a paint or polymeric material such as polytetrafluoroethylene or similar material. The spacer is used along with a primary sealant material as described herein. The spacer may include a channel and/or a notch as described herein. In one embodiment, the spacer includes one or more connector keys as described herein. In one embodiment, the spacer is coated on all sides; in another embodiment, the spacer is coated on only the sides proximate the bus bar and/or bus bar lead.

For example, the spacer may be made from a metal having the shape and dimensions of a conventional metal spacer and be coated with a non-conductive or insulating coating. For example, the spacer may be made from aluminum and the outer non-conductive coating may be an anodized layer. More generally, any form of passivation may be employed to provide a tough, non-conductive coating. Other metals that can be electrolytically passivated in a similar manner to aluminum include titanium, zinc, magnesium, tantalum, and niobium, for example. It should be understood that the passivating layer also may be made from many different forms of inorganic non-conductive materials, such as metal oxides, carbides, and nitrides. Alternatively, the non-conductive coating may be an organic-based material such as a thermosetting or thermoplastic resin, a wax, an elastomer, or a polymeric material, for example. Some examples of non-conducting-coatings include polyurethanes, acrylics, polyesters, epoxies, and hybrids of these. Painting and powder coating are two examples of suitable processes for applying non-conductive organic based materials. In some embodiments, a commercially available non-conductive (e.g., insulating) paint is applied to the surface of the metal spacer that faces the electrochromic stack. The paint may be black or clear or any other color. The paint also may be applied to one or more of the remaining surfaces of the spacer for aesthetic reasons.

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims.

What is claimed is:
1. An insulated glass unit (IGU) comprising:
   a. a first substantially transparent substrate having an optically switchable device disposed on a surface of the first substantially transparent substrate;
   b. a second substantially transparent substrate;
   c. an electrically insulating spacer between the first and the second substantially transparent substrates, the electrically insulating spacer having a substantially rectangular cross section and comprising an electrically insulating material;
   d. a sealing material bonding the first and second substantially transparent substrates to the electrically insulating spacer, thereby forming a sealed interior space between the first and second substantially transparent substrates, wherein the optically switchable device faces the sealed interior space of the IGU; and e. one or more bus bars configured to deliver power to the optically switchable device, wherein the one or more bus bars are disposed, along their length, between the electrically insulating spacer and the first substantially transparent substrate, and not within the inner perimeter of the electrically insulating spacer.

2. The IGU of claim 1, wherein the electrically insulating material is a plastic, a polymer, a foam, or a rubber.

3. The IGU of claim 1, wherein the electrically insulating spacer contacts the first and second substantially transparent substrates along surfaces that are between about 5 mm and about 10 mm wide.

4. The IGU of claim 1, wherein the sealing material includes polyisobutylene or polyvinyl butyral.

5. The IGU of claim 1, further comprising wiring disposed within the electrically insulating spacer and configured for providing electrical communication between bus bars of the optical device and a power source.

6. The IGU of claim 1, wherein the sealed interior space contains an inert gas.

7. The IGU of claim 1, wherein the optically switchable device is an electrochromic device.

8. The IGU of claim 1, wherein at least one of the first and second substantially transparent substrates is laminated to a reinforcing pane.

9. An insulated glass unit (IGU) comprising:
  a. a first substantially transparent substrate having an optically switchable device disposed on a surface of the first substantially transparent substrate, wherein the optically switchable device is an electrochromic device;
  b. a second substantially transparent substrate;
  c. an electrically insulating spacer between the first and the second substantially transparent substrates, the electrically insulating spacer having a substantially rectangular cross section and comprising an electrically insulating material;
  d. a sealing material bonding the first and second substantially transparent substrates to the electrically insulating spacer, thereby forming a sealed interior space between the first and second substantially transparent substrates; and
  e. one or more bus bars configured to deliver power to the electrochromic device, wherein the one or more bus bars are disposed, along their length, between the electrically insulating spacer and the first substantially transparent substrate, and not within the inner perimeter of the electrically insulating spacer; and wherein the electrochromic device has a perimeter edge residing past the inner perimeter of the electrically insulating spacer, such that a portion of the electrochromic device colors under the electrically insulating spacer, the electrochromic device is configured to color completely to the inner perimeter of the electrically insulating spacer and there are no inactive area perimeter edge region scribe lines or bus bar isolating scribe lines in the electrochromic device within the inner perimeter of the electrically insulating spacer.

10. A connector key for joining a pair of open ends of a hollow metal IGU spacer, the hollow metal IGU spacer having a substantially rectangular cross section, the connector key configured to accommodate a bus bar lead for an electrochromic device; wherein the connector key and the hollow IGU metal spacer have surfaces for mating with the glass of an IGU, which surfaces are substantially co-planar when the connector key is mated with the pair of open ends of the hollow metal IGU spacer.

11. The connector key of claim 10, wherein the open ends of the hollow metal IGU spacer are each configured to slide over a portion of the connector key.

12. The connector key of claim 10, wherein the open ends of the hollow metal IGU spacer are each configured to slide into a portion of the connector key.

13. The connector key of claim 10, comprising a channel configured to accommodate the bus bar lead.

14. The connector key of claim 13, wherein the channel is between about 0.1 mm and about 1 mm high, and between about 4.5 mm and about 10 mm wide.

15. The connector key of claim 10, wherein the connector key is made of a metal or a plastic.

16. An insulated glass unit (IGU) comprising:
  a. a first substantially transparent substrate having an electrochromic device disposed on a surface of the first substantially transparent substrate;
  b. a second substantially transparent substrate;
  c. a hollow metal spacer between the first and the second substantially transparent substrates, the hollow metal spacer having a substantially rectangular cross section;
  d. a connector key joining a pair of ends of the hollow metal spacer, the connector key configured to accommodate a bus bar lead for the electrochromic device; wherein the connector key and the hollow metal spacer comprise surfaces that mate with first and second substantially transparent substrates, which surfaces are substantially co-planar; and
  e. a sealing material bonding the first and second substantially transparent substrates to the hollow metal spacer and the connector key, thereby forming a sealed interior space between the first and second substantially transparent substrates.

17. The IGU of claim 16, wherein the sealing material includes polyisobutylene or polyvinyl butyral.

18. The IGU of claim 16, wherein the electrochromic device faces the sealed interior space of the IGU.

19. The IGU of claim 16, wherein the sealed interior space contains an inert gas.

20. The IGU of claim 16, wherein the ends of the hollow metal spacer are each configured to slide over a portion of the connector key.

21. The IGU of claim 16, wherein the pair of ends of the hollow metal spacer are each configured to slide into a portion of the connector key.

22. The IGU of claim 16, wherein the connector key comprises a channel configured to accommodate the bus bar lead.

23. The IGU of claim 16, wherein the connector key is made of a plastic.

24. The IGU of claim 16, wherein at least one of the first and second substantially transparent substrates is laminated to a reinforcing pane.

25. An insulated glass unit (IGU) comprising:
  a. a first substantially transparent substrate having an electrochromic device disposed on a surface of the first substantially transparent substrate;
  b. a second substantially transparent substrate;
  c. a metal spacer between the first and second substantially transparent substrates, the metal spacer having a substantially rectangular cross section, and at least one side of the metal spacer comprising a recess configured to accommodate the length of one or more bus bars of the electrochromic device such that there is no contact between the metal spacer and the one or more bus bars, and wherein the one or more bus bars are disposed, along their length, between the metal spacer and the first substantially transparent substrate, and not within the inner perimeter of the metal spacer; and d. a sealing material bonding the first and second substantially transparent substrates to the metal spacer.

26. The IGU of claim 25, wherein the recess is a channel.

27. The IGU of claim 25, wherein the metal spacer is between about 10 mm and about 15 mm wide.

28. The IGU of claim 25, wherein the metal spacer is stainless steel.

29. The IGU of claim 25, wherein the metal spacer comprises the recess on two sides.

30. The IGU of claim 25, wherein at least one of the first and second substantially transparent substrates is laminated to a reinforcing pane.

* * * * *